United States Patent
Kodama et al.

(10) Patent No.: US 9,687,777 B2
(45) Date of Patent: Jun. 27, 2017

(54) GAS SEPARATION COMPOSITE MEMBRANE, GAS SEPARATION MODULE, GAS SEPARATION APPARATUS, GAS SEPARATION METHOD, AND METHOD OF PRODUCING GAS SEPARATION COMPOSITE MEMBRANE

(71) Applicant: FUJIFILM Corporation, Minato-ku, Tokyo (JP)

(72) Inventors: Keisuke Kodama, Kanagawa (JP); Ichiro Nagata, Kanagawa (JP); Takeshi Narita, Kanagawa (JP); Satoshi Sano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 14/730,858

(22) Filed: Jun. 4, 2015

(65) Prior Publication Data
US 2015/0265964 A1 Sep. 24, 2015

Related U.S. Application Data

(63) Continuation of application No. PCT/JP2013/082034, filed on Nov. 28, 2013.

(30) Foreign Application Priority Data
Dec. 10, 2012 (JP) .................... 2012-269841

(51) Int. Cl.
*B01D 53/22* (2006.01)
*B01D 69/12* (2006.01)
(Continued)

(52) U.S. Cl.
CPC .......... *B01D 53/228* (2013.01); *B01D 53/22* (2013.01); *B01D 67/0006* (2013.01);
(Continued)

(58) Field of Classification Search
CPC .. B01D 53/22; B01D 53/228; B01D 67/0006; B01D 69/12; B01D 69/125; B01D 71/64;
(Continued)

(56) References Cited

U.S. PATENT DOCUMENTS

| | | | |
|---|---|---|---|
| 5,009,934 A * | 4/1991 | Wenski ................. | B01D 71/64 427/387 |
| 7,247,191 B2 | 7/2007 | Koros et al. | |

(Continued)

FOREIGN PATENT DOCUMENTS

| | | |
|---|---|---|
| JP | 58-006205 A | 1/1983 |
| JP | 63-93326 A | 4/1988 |

(Continued)

OTHER PUBLICATIONS

Journal of the University of Petroleum, China, 1999, pp. 77-79, vol. 23.

(Continued)

Primary Examiner — Jason M Greene
(74) Attorney, Agent, or Firm — Sughrue Mion, PLLC

(57) ABSTRACT

A gas separation composite membrane, containing a gas permeable supporting layer, and a gas separating layer containing a crosslinked polyimide resin above the gas permeable supporting layer, in which the crosslinked polyimide resin has a structure in which 2 to 4 molecules of a polyimide compound is coordinated with a divalent to tetravalent central metal via an oxygen atom or a sulfur atom, and when the crosslinked polyimide resin has plural central metals, the plural central metals are linked via the polyimide chain of the polyimide compound; and a gas separating module, a gas separation apparatus and a gas separation method utilizing this gas separation composite membrane.

14 Claims, 1 Drawing Sheet

(51) Int. Cl.
*B01D 67/00* (2006.01)
*B01D 71/64* (2006.01)
*C08G 73/10* (2006.01)
*C08G 73/14* (2006.01)
*B01D 71/82* (2006.01)

(52) U.S. Cl.
CPC ............ *B01D 69/12* (2013.01); *B01D 69/125* (2013.01); *B01D 71/64* (2013.01); *B01D 71/82* (2013.01); *C08G 73/105* (2013.01); *C08G 73/1039* (2013.01); *C08G 73/1071* (2013.01); *C08G 73/14* (2013.01); *B01D 2257/504* (2013.01); *B01D 2258/0283* (2013.01); *B01D 2323/30* (2013.01); *Y02C 10/10* (2013.01); *Y02C 20/20* (2013.01); *Y02P 20/152* (2015.11)

(58) Field of Classification Search
CPC .............. B01D 71/82; B01D 2257/504; B01D 2323/30; B01D 2323/40; C08G 73/1039; C08G 73/105; C08G 73/1071; C08G 73/14
See application file for complete search history.

(56) References Cited

U.S. PATENT DOCUMENTS

| 9,452,392 | B2* | 9/2016 | Sano ...................... B01D 71/72 |
| 2003/0220188 | A1* | 11/2003 | Marand ................ B01D 53/228 502/60 |
| 2010/0326273 | A1 | 12/2010 | Liu |
| 2013/0255490 | A1* | 10/2013 | Matteucci ............ B01D 53/228 95/51 |
| 2015/0232397 | A1* | 8/2015 | Kishida ................ B01D 53/228 585/830 |

FOREIGN PATENT DOCUMENTS

JP    3-42026 A    2/1991
JP    2007-297605 A    11/2007

OTHER PUBLICATIONS

Andreas Taubert, et al., "Novel polyimide ionomers: $CO_2$ plasticization, morphology, and ion distribution", Polymer, 2003, pp. 1881-1892, col. 44.
S. Hess, et al., "Propene/propane separation with copolyimide membranes containing silver ions", Journal of Membrane Science, 2006, pp. 52-60, vol. 275.
"Membranes for Gas and Vapor Separation", Johns Wiley & Sons Ltd., 2010, 4 pages.
Richard W. Baker, et al., "Natural Gas Processing with Membranes: An Overview", Ind. Eng. Chem. Res., 2008, pp. 2109-2121, vol. 47.
Richard W. Baker, "Future Directions of Membrane Gas Separation Technology", Ind. Eng. Chem. Res., 2002, pp. 1393-1411, vol. 41.
John D. Wind, et al., "The Effects of Crosslinking Chemistry on $CO_2$ Plasticization of Polyimide Gas Separation Membranes", Ind. Eng. Chem. Res., 2002, pp. 6139-6148, vol. 41.
J. Kurdi, et al., "Improvement in polyetherimide gas separation membranes through the incorporation of nanostructured metal complexes", Polymer, 2003, pp. 4533-4540, vol. 44.
International Search Report for PCT/JP2013/082034 dated Feb. 25, 2014.
Communication dated Mar. 29, 2016 from the Japanese Patent Office issued in corresponding Application No. 2012-269841.

* cited by examiner

GAS SEPARATION COMPOSITE MEMBRANE, GAS SEPARATION MODULE, GAS SEPARATION APPARATUS, GAS SEPARATION METHOD, AND METHOD OF PRODUCING GAS SEPARATION COMPOSITE MEMBRANE

CROSS-REFERENCE TO RELATED APPLICATIONS

This application is a continuation of PCT/JP2013/082034 filed on Nov. 28, 2013 which claims benefit of Japanese Patent Application No. 2012-269841 filed on Dec. 10, 2012, the subject matters of which are incorporated herein by reference in their entirety.

TECHNICAL FIELD

The present invention relates to a gas separation composite membrane, and a gas separating module, a gas separation apparatus and a gas separation method utilizing thereof; and a method of producing a gas separation composite membrane.

BACKGROUND ART

Raw materials comprising a polymer compound have characteristic gas permeability for each raw material. Based on properties thereof, a desired gas component can be separated by allowing selective permeation, by means of a membrane constituted of a specific polymer compound. As an industrial application embodiment of this gas separation membrane, studies have been conducted for separating and recovering carbon dioxide from a large-scale carbon dioxide source, in a thermal power station, a cement plant, a blast furnace in a steel plant or the like, in relation to a global warming issue. Then, this membrane separation technique attracts attention as a solution to an environmental issue to allow achievement by relatively small energy. Meanwhile, natural gas or bio gas (gases generated by fermentation or anaerobic digestion of excreta of organisms, organic fertilizers, biodegradable substances, polluted water, garbages, energy crops, or the like) is a mixed gas mainly composed of methane and carbon dioxide. Studies have been made so far for a membrane separation method as a means for removing an impurity, such as carbon dioxide therein (Patent Literature 1).

In regard to the purification of natural gas according to the membrane separation method, celluloses and polyimides have been studied as the materials for the membrane for use in the membrane separation method. However, due to the high pressure conditions in actual industrial plants, the influence of impurities present in natural gas or the like, the membrane is plasticized, and there has been a problem of a lowering in separation selectivity attributable to that (pages 313-322 of Non-Patent Literature 1, and Non-Patent Literatures 2 and 3). In order to suppress this plasticization of a membrane, it is known to be effective to introduce a crosslinked structure or a branched structure to the polymer compound that constitutes the membrane, and research has been conducted on a separation membrane which uses a polyimide resin (pages 3 to 27 of Non-Patent Literature 1, Non-Patent Literatures 4 and 5, and Patent Literatures 2 and 3).

For example, Non-Patent Literature 4 describes a gas separation membrane of a polyimide that is ionically crosslinked using a metal complex. In Non-Patent Literature 4, simple membranes having a thickness of 40 to 60 μm were produced using three types of polyimides such as a non-crosslinked form, a form crosslinked by covalent bonding, and an ionically crosslinked form, and the gas separation performance of those membranes were compared. It has been reported that an enhancement of the gas separation performance was almost not recognized in the gas separation membrane that uses an ionically crosslinked polyimide using a metal complex, and the gas separation performance was enhanced in the polyimide in which a crosslinked structure is formed by covalent bonding. Also, Non-Patent Literature 5 reports that aggregates of a metal complex are formed in the simple membrane that is ionically crosslinked using a metal complex as described in Non-Patent Literature 4.

CITATION LIST

Patent Literatures

Patent Literature 1: JP-A-2007-297605 ("JP-A" means unexamined published Japanese patent application)
Patent Literature 2: U.S. Pat. No. 7,247,191
Patent Literature 3: US 2010/0326273

Non-Patent Literatures

Non-Patent Literature 1: Yuri Yampolskii, Benny Freeman, Membrane Gas Separation, 2010, Johns Wiley & Sons Ltd.
Non-Patent Literature 2: Industrial & Engineering Chemistry Research, 2008, 47, 2109
Non-Patent Literature 3: Industrial & Engineering Chemistry Research, 2002, 41, 1393
Non-Patent Literature 4: Industrial & Engineering Chemistry Research, 2002, 41, 6139-6148
Non-Patent Literature 5: Polymer, 2003, 44, 1881-1892

SUMMARY OF THE INVENTION

Technical Problem

In order to obtain a practically useful gas separation membrane, sufficient gas permeability and separation performance should be secured by making the gas separating layer into a thin layer. Investigations have been hitherto made so as to satisfy high gas permeability, high separation selectivity, and mechanical strength by producing an asymmetric membrane from a single material, and making the portion that contributes to separation into a thin layer called a skin layer. However, it is difficult to realize all of these using a single material. Therefore, a composite membrane in which the separation function and the function for imparting mechanical strength are assigned to different materials, has been investigated. However, it cannot be said that the composite membrane exhibits satisfactory performance.

In a gas separation composite membrane, it is necessary to form the membrane that is in charge of the separation function into a thin membrane similarly to the skin layer, in order to insure sufficient gas permeability. However, in general, when a polyfunctional component (a compound having three or more polymerizable groups) is used as a synthesis raw material in order to satisfy mechanical strength, and thereby a number of multibranched structures are introduced into the polymer compound, gelling is prone to occur, and the resulting polymer compound has poor solubility in solvents and has poor coatability and membrane forming properties. Therefore, for example, in the hyperbranched polyimide described in Patent Literature 3, even if this polyimide is applied to form a membrane, it is difficult to form a membrane in the form of a thin membrane exhibiting uniform and sufficient gas permeability. Therefore, a separation membrane produced using a polymer compound having a large number of multibranched structure has limitations in connection with the gas permeation performance.

The present invention relates to provide a gas separation composite membrane which has excellent gas permeability and mechanical strength and is not easily plasticized even at a high pressure and in the presence of a plasticizing impurity, and in which deterioration of the performance is further suppressed; and a method of producing the same.

In view of the matters described above, the present inventors conducted thorough investigations. As a result, the present inventors paid attention to the fact that in a solution (coating liquid) prepared by mixing a metal complex and a particular polyimide compound in a solvent, if the metal complex and the polyimide compound are not at or above particular concentrations, ligand exchange between the two compounds is not likely to proceed, and the formation of metal crosslinking in the polyimide resin is suppressed. It was also found that since this coating liquid can be applied on a support in a state of being less viscous, the coating liquid can be applied in the form of a thinner membrane on the support, and after coating, the formation of crosslinking proceeds rapidly together with volatilization of the solvent. These findings were applied to a gas separation composite membrane. As a result, when the coating liquid is applied on a gas permeable porous support, the formation of crosslinking proceeds rapidly, and thereby the time for the coating liquid to penetrate into the porous support is limited. Thus, formation of a thin membrane having a more uniform thickness is enabled. It was also found that a gas separation composite membrane containing a thin gas separating layer formed from this metal-crosslinked polyimide is excellent in all of gas permeability, gas separation selectivity, and mechanical strength, and the membrane is more resistant to plasticization.

The present invention was completed based on these findings.

The problems described above were solved by the following means.

<1> A gas separation composite membrane, containing:
a gas permeable supporting layer; and
a gas separating layer containing a crosslinked polyimide resin above the gas permeable supporting layer,
wherein the crosslinked polyimide resin has a structure in which 2 to 4 molecules of a polyimide compound is coordinated with a divalent to tetravalent central metal via an oxygen atom or a sulfur atom, and
wherein when the crosslinked polyimide resin has plural central metals, the plural central metals are linked via the polyimide chain of the polyimide compound.

<2> The gas separation composite membrane according to the above item <1>, wherein the polyimide compound has a repeating unit represented by Formula (I), a repeating unit represented by Formula (II-a) or (II-b), and a repeating unit represented by Formula (III-a) or (III-b):

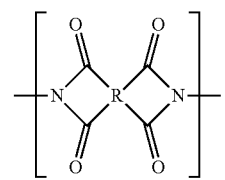

Formula (I)

wherein R represents a group having a structure represented by any one of Formulas (I-a) to (I-h); $X^1$ represents a single bond or a divalent linking group; L represents —CH=CH— or —CH$_2$—; $R^1$ and $R^2$ each represent a hydrogen atom or a substituent; and the symbol "*" represents a bonding site to the carbonyl group;

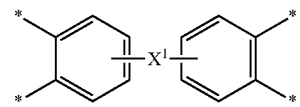
(I-a)

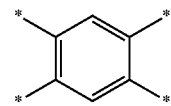
(I-b)

(I-c)

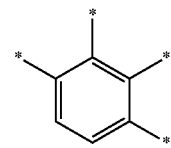
(I-d)

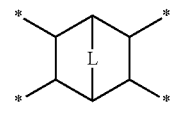
(I-e)

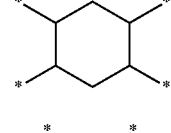
(I-f)

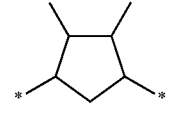
(I-g)

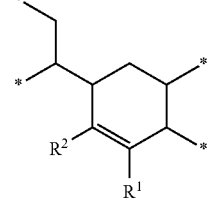

(I-h)

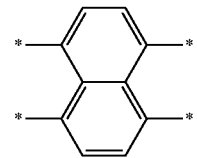

-continued

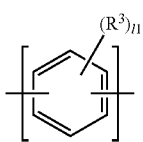
Formula (II-a)

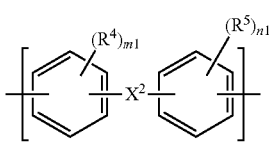
Formula (II-b)

wherein $R^3$ represents an alkyl group or a halogen atom; $R^4$ and $R^5$ each represent an alkyl group or a halogen atom, or are linked to each other to form a ring together with $X^2$; l1, m1 and n1 each represent an integer of from 0 to 4; and $X^2$ represents a single bond or a divalent linking group; and

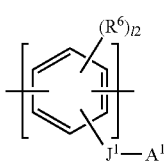
Formula (III-a)

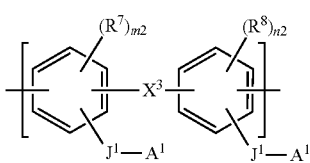
Formula (III-b)

wherein $R^6$, $R^7$, and $R^8$ each represent a substituent; $J^1$ represents a single bond or a divalent linking group; l2, m2, and n2 each represent an integer of from 0 to 3; $A^1$ represents a group selected from the group consisting of —COOH, —OH, —SH, and —S(=O)$_2$OH; and $X^3$ represents a single bond or a divalent linking group.

<3> The gas separation composite membrane according to the above item <1> or <2>, wherein the central metal is Be, Mg, Ca, Sc, Y, Ti, Zr, V, Cr, Mo, Mn, Fe, Co, Ni, Cu, Zn, B, Al, Ga, or In.

<4> The gas separation composite membrane according to any one of the above items <1> to <3>, wherein in a case in which the gas to be separation treated is a mixed gas of carbon dioxide and methane, the permeation rate of the carbon dioxide at 40° C. and 40 atmospheric pressure is more than 20 GPU, and the ratio of the permeation rate of the carbon dioxide to the permeation rate of the methane ($R_{CO2}/R_{CH4}$) is 15 or more.

<5> The gas separation composite membrane according to any one of the above items <1> to <4>, wherein the supporting layer contains a porous layer on a side of the gas separating layer and a nonwoven fabric layer on a side reverse thereto.

<6> The gas separation composite membrane according to the above item <5>, wherein the cut-off molecular weight of the porous layer is 100,000 or less.

<7> A gas separation module, containing the gas separation composite membrane according to any one of the above items <1> to <6>.

<8> A gas separation apparatus, containing the gas separation module according to the above item <7>.

<9> A method of separating a gas, containing causing carbon dioxide to selectively permeate from a gas containing carbon dioxide and methane, using the gas separation composite membrane according to any one of the above items <1> to <6>.

<10> A method of producing a gas separation composite membrane, wherein the gas separation composite membrane contains a gas permeable supporting layer, and a gas separating layer above the gas permeable supporting layer, the method containing the steps of:

applying a solution containing a polyimide compound having an active hydrogen-containing group and a metal complex above the gas permeable supporting layer, thereby performing ligand exchange between the polyimide compound and the metal complex; and forming the gas separating layer containing a metal-crosslinked polyimide resin above the gas permeable supporting layer.

<11> The method according to the above item <10>, wherein the central atom of the metal complex is Be, Mg, Ca, Sc, Y, Ti, Zr, V, Cr, Mo, Mn, Fe, Co, Ni, Cu, Zn, B, Al, Ga, or In.

<12> The method according to the above item <10> or <11>, wherein the metal complex has two or more ligands selected from the group consisting of an alkoxy group, an aryloxy group, a carboxylate group, a sulfate group, a cyano group, an ammonium group, a phosphate group, a β-diketone, a β-keto ester, and a halogen atom.

<13> The method according to any one of the above items <10> to <12>, wherein the polyimide compound has a repeating unit represented by Formula (I), a repeating unit represented by Formula (II-a) or (II-b), and a repeating unit represented by Formula (III-a) or (III-b):

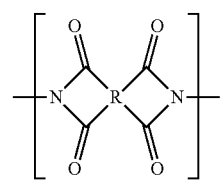
Formula (I)

wherein R represents a group having a structure represented by any one of Formulas (I-a) to (I-h); $X^1$ represents a single bond or a divalent linking group; L represents —CH=CH— or —CH$_2$—; $R^1$ and $R^2$ each represent a hydrogen atom or a substituent; and the symbol "*" represents a bonding site to the carbonyl group;

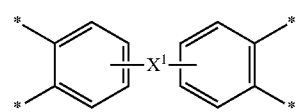
(I-a)

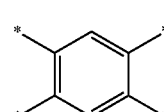
(I-b)

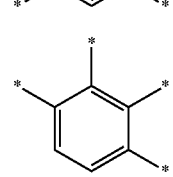
(I-c)

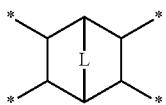
(I-d)

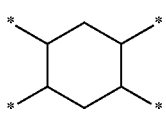
(I-e)

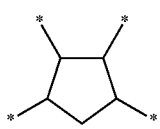
(I-f)

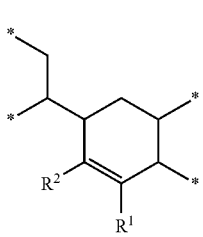
(I-g)

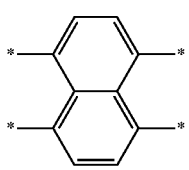
(I-h)

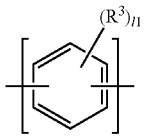
Formula (II-a)

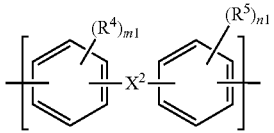
Formula (II-b)

wherein $R^3$ represents an alkyl group or a halogen atom; $R^4$ and $R^5$ each represent an alkyl group or a halogen atom, or are linked to each other to form a ring together with $X^2$; l1, m1 and n1 each represent an integer of from 0 to 4; and $X^2$ represents a single bond or a divalent linking group; and

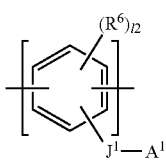
Formula (III-a)

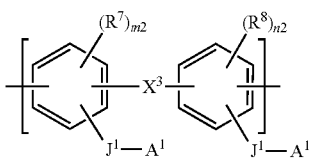
Formula (III-b)

wherein $R^6$, $R^7$, and $R^8$ each represent a substituent; $J^1$ represents a single bond or a divalent linking group; l2, m2, and n2 each represent an integer of from 0 to 3; $A^1$ represents a group selected from the group consisting of —COOH, —OH, —SH, and —S(=O)$_2$OH; and $X^3$ represents a single bond or a divalent linking group.

According to the present specification, when there are a large number of substituents, linking groups and the like (hereinafter, referred to as substituents and the like), which are denoted by particular symbols, or when plural substituents and the like are defined simultaneously or selectively, it is noted that the respective substituents may be identical with or different from each other. Furthermore, even if not particularly stated otherwise, it is noted that when plural substituents and the like are adjacent or adjoining, those substituents and the like may be linked or condensed together and form a ring.

In regard to the denotation of compounds (including resins) in the present specification, the denotation of a compound is used to mean the relevant compound itself as well as a salt thereof and an ion thereof. Furthermore, the denotation is meant to include a structure in which a predetermined portion has been modified, to the extent that the desired effects are provided.

In regard to a substituent (the same also applies to a linking group) for which it is not described in the present specification on whether the substituent is substituted or unsubstituted, it is meant that the group may have an arbitrary substituent, to the extent that desired effects are provided. The same also applies to a compound for which it is not described whether the compound is substituted or unsubstituted.

When a substituent is mentioned in the present specification, unless particularly stated otherwise, the group of substituents Z described below is designated as a preferred scope of the substituent.

The gas separation composite membrane of the present invention has excellent mechanical strength of the gas separating layer, and is not easily plasticized even at a high pressure and in the presence of a plasticizing impurity. Furthermore, the gas separating layer can be made into a thinner layer, and excellent gas permeability and high gas separation selectivity are realized. Furthermore, according to the method of producing a gas separation composite membrane of the present invention (hereinafter, referred to as production method of the present invention), the gas separating layer of the relevant composite membrane can be made thinner, and the thickness can be made more uniform. Thus, a gas separation membrane having enhanced gas permeability can be obtained. Furthermore, the gas separation composite membrane obtainable by the production method of the present invention also has excellent mechanical strength and durability.

Other and further features and advantages of the invention will appear more fully from the following description, appropriately referring to the accompanying drawings.

MODE FOR CARRYING OUT THE INVENTION

The present invention is described in detail below.

[Composite Membrane]

The gas separation composite membrane of the present invention (hereinafter, also simply referred to as "composite membrane of the present invention") has a gas separating layer containing a particular crosslinked polyimide resin above a gas permeable supporting layer. This composite membrane is preferably formed by coating a coating liquid (dope) to form the above-described gas separating layer ("coating" herein includes an embodiment in which the coating liquid is attached on the surface by dipping) at least on a surface of a porous support.

Figure 1:
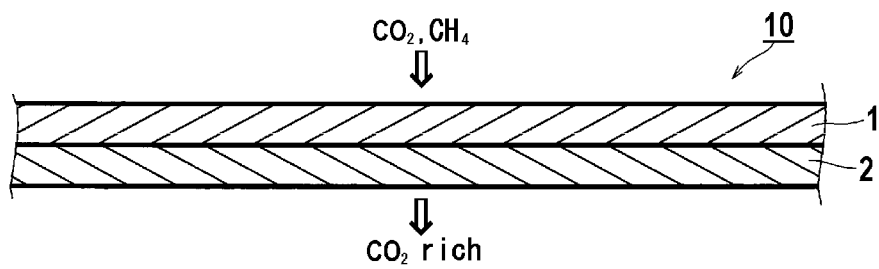
FIG. 1 is a cross-sectional diagram schematically showing an embodiment of the gas separation composite membrane of the present invention.
Figure 2:
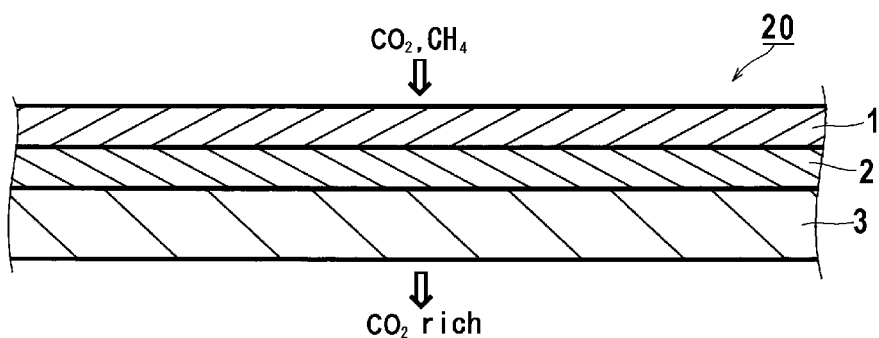
FIG. 2 is a cross-sectional diagram schematically showing another embodiment of the gas separation composite membrane of the present invention.

FIG. 1 is a vertical cross-sectional diagram schematically showing the gas separation composite membrane 10, being a preferred embodiment according to the present invention. The reference sign 1 is a gas separating layer and the reference sign 2 is a supporting layer constituted of a porous layer. FIG. 2 is a cross-sectional view schematically showing a gas separation composite membrane 20, being a preferred embodiment according to the present invention. According to this embodiment, in addition to the gas separating layer 1 and the porous layer 2, a nonwoven fabric layer 3 is added as the supporting layer.

The term "above a supporting layer" as used in the present specification means that there may be another layer interposed between the supporting layer and the gas separating layer. In addition, unless otherwise noted, with regard to expressions "over" and "under", a direction in which a gas to be separated is supplied is referred to as "over", and a direction from which a separated gas is discharged is referred to "under".

The gas separation composite membrane according to the present invention may have the gas separating layer formed and arranged on the surface or inside of the porous support (supporting layer). The gas separating layer is formed at least on the surface, and thus the composite membrane can be simply realized. Formation of the gas separating layer at least on the surface of the porous support allows realization of a composite membrane having advantages of high separation selectivity, high gas permeability and also mechanical strength. Regarding the membrane thickness of the separating layer, the membrane is preferably as thin as possible under conditions to provide superior gas permeability while maintaining mechanical strength and separation selectivity.

The porous support (porous layer) preferably applied for the supporting layer is not particularly limited so long as it satisfies mechanical strength and high gas permeability. The porous support may be a porous membrane made of any organic or inorganic substance and is preferably an organic polymer porous membrane. The thickness thereof is preferably from 1 to 3,000 µm, more preferably from 5 to 500 µm, and further preferably from 5 to 150 µm. Regarding the fine pore structure of this porous membrane, a mean pore diameter is ordinarily 10 µm or less, preferably 0.5 µm or less, and more preferably 0.2 µm or less, and a porosity is preferably from 20% to 90%, and more preferably from 30% to 80%. Furthermore, the cut-off molecular weight of the porous layer is preferably 100,000 or less, and the gas permeability is preferably $3 \times 10^{-5}$ cm$^3$ (STP)/cm$^2$·sec·cmHg (30 GPU) or more as the permeation rate of carbon dioxide, at 40° C. and 40 atmospheric pressure. Examples of the material for the porous membrane include conventionally known polymers, including polyolefin-based resins such as polyethylene and polypropylene; fluorine-containing resins such as polytetrafluoroethylene, polyvinyl fluoride, and polyvinylidene fluoride; and various resins such as polystyrene, cellulose acetate, polyurethane, polyacrylonitrile, polyphenyleneoxide, polysulfone, polyethersulfone, polyimide and polyaramide. The shape of the porous membrane may be any of plate, spiral, tubular or hollow fibers.

In regard to the composite membrane of the present invention, it is preferable that a support is formed below the supporting layer on which the gas separating layer is formed, in order to further impart mechanical strength. Specific examples of such a support include a woven fabric, a nonwoven fabric and a net, and a nonwoven fabric is preferably used in view of membrane-forming properties and cost. As the nonwoven fabric, fibers formed of polyester, polypropylene, polyacrylonitrile, polyethylene, polyamide or the like may be used alone or in combination with a plurality of fibers. The nonwoven fabric can be produced, for example, by paper-making of main fibers and binder fibers that are uniformly dispersed in water, using a cylinder mold, a fourdrinier or the like, and drying the resultant product by a drier. Moreover, the nonwoven fabric is preferably interposed between two rolls and subjected to pressure-heating processing for the purpose of removing fluff or improving mechanical properties.

The composite membrane of the present invention can be suitably used for a gas separation and collection method and a gas separation and purification method. For example, the gas separating composite membrane can be processed into a gas separation membrane that can efficiently separate a specific gas from a gaseous mixture containing hydrogen, helium, carbon monoxide, carbon dioxide, hydrogen sulfide, oxygen, nitrogen, ammonia, sulfur oxide, nitrogen oxide, a hydrocarbon such as methane and ethane, an unsaturated hydrocarbon such as propylene, or a gas of a perfluoro compound such as tetrafluoroethane. In particular, the gas separating composite membrane is preferably processed into a gas separation membrane for selectively separating carbon dioxide from a gaseous mixture containing carbon dioxide/hydrocarbon (methane).

Particularly, in a case in which the gas to be separation treated is a mixed gas of carbon dioxide and methane, the permeation rate of carbon dioxide at 40° C. and 40 atmospheric pressure is preferably more than 20 GPU, and more preferably 20 to 300 GPU. The ratio of the permeation rate of the carbon dioxide to the permeation rate of the methane ($R_{CO_2}/R_{CH_4}$) is preferably 15 or more, more preferably 20 or more, and particularly preferably 20 to 50.

Herein, 1 GPU is defined to be $1 \times 10^{-6}$ cm$^3$ (STP)/cm$^2$·sec·cmHg

The mechanism of dissolution and diffusion to the membrane is thought to be involved in the above-described selective gas permeation. Study has been made for a separation membrane containing a polyethyleneoxy (PEO) composition by taking an advantage of such a viewpoint (see Journal of Membrane Science, 1999, 160, 87-99). This results from strong interaction of carbon dioxide with the polyethyleneoxy composition. This polyethyleneoxy membrane is a flexible and rubbery polymer membrane having a low glass transition temperature, and therefore a difference of diffusion coefficients depending on gas species is small, and separation selectivity is mainly caused due to an effect of a difference in solubility. In contrast, in the composite membrane of the present invention, the glass transition temperature of the polyimide resin applied thereto is high, and a large improvement can be made even from the viewpoint of thermal durability of the membrane while exhibiting the above-described dissolution/diffusion action.

<Polyimide Compound>

The polyimide compound used in the present invention is explained in detail below.

According to the present invention, to explain more specifically, it is preferable that the polyimide compound that constitutes the crosslinked polyimide resin contains at least one repeating unit represented by Formula (I), at least one repeating unit represented by Formula (II-a) or (II-b), and at least one repeating unit represented by Formula (III-a) or (III-b).

The polyimide resin used in the present invention may contain a repeating unit other than the various repeating units described above. However, when the sum of the numbers of moles of the various repeating units represented by Formulas (I), (II-a), (II-b), (III-a) and (III-b) is designated as 100, the number of moles of the other repeating unit is preferably 20 or less, and more preferably 0 to 10. It is particularly preferable that the polyimide resin used in the present invention is composed only of the various repeating units represented by the above-described Formulas (I), (II-a) or (II-b), and (III-a) or (III-b).

Formula (I)

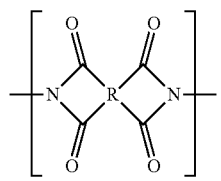

In Formula (I), R represents a group having a structure represented by any one of Formulas (1-a) to (1-h). In Formulas (1-a) to (1-h), the symbol "*" represents the bonding site to the carbonyl group of Formula (I). R in Formula (I) may be called a mother nucleus. This mother nucleus R is preferably a group represented by Formula (1-a), (1-b) or (1-d), more preferably a group represented by Formula (1-a) or (1-d), and particularly preferably a group represented by Formula (1-a).

(I-a)

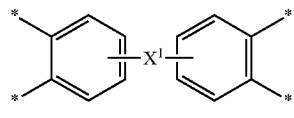

(I-b)

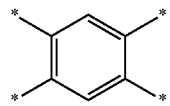

(I-c)

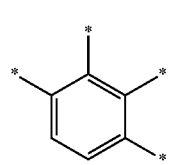

(I-d)

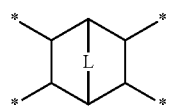

(I-e)

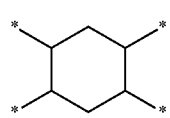

(I-f)

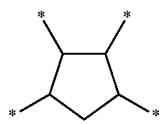

(I-g)

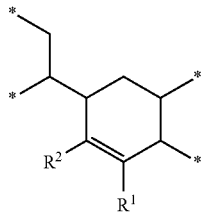

(I-h)

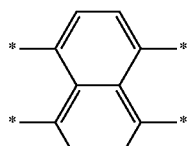

Formula (II-a)

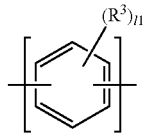

Formula (II-b)

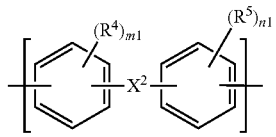

Formula (III-a)

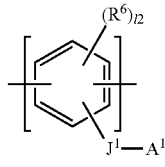

Formula (III-b)

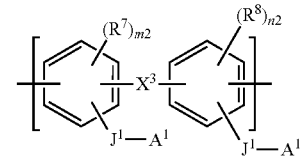

$X^1$, $X^2$ and $X^3$ $X^1$, $X^2$ and $X^3$ represent a single bond or a divalent linking group. The divalent linking group is preferably —$C(R^x)_2$— (wherein IV represents a hydrogen atom or a substituent; when IV is a substituent, these substituents may be linked to each other and form a ring), —O—, —$SO_2$—, —C(=O)—, —S—, —$NR^Y$— (wherein $R^Y$ represents a hydrogen atom, an alkyl group (preferably a methyl group or an ethyl group), or an aryl group (preferably a phenyl group)), or a combination thereof; and more preferably a single bond or —$C(R^x)_2$—. When IV represents a substituent, specific examples thereof include the group of substituents Z described below, and among them, an alkyl group (a preferred range is the same as the group of substituents Z described below) is preferred, an alkyl group having a halogen atom as a substituent is more preferred, while trifluoromethyl is particularly preferred. When it is said that members "may be linked to each other and form a ring" in the present specification, the members may be bonded by a single bond, a double bond or the like and form a cyclic structure, or the members may be condensed and form a condensed ring structure.

L

L represents —CH=CH— or —CH$_2$—, and is preferably —CH=CH—.

$R^1$ and $R^2$ $R^1$ and $R^2$ each represent a hydrogen atom or a substituent. For the substituent, any one selected from the group of substituents Z described below can be used. $R^1$ and $R^2$ may be bonded to each other and form a ring.

Each of $R^1$ and $R^2$ is preferably a hydrogen atom or an alkyl group, more preferably a hydrogen atom, a methyl group or an ethyl group, and further preferably a hydrogen atom.

$R^3$ $R^3$ represents an alkyl group or a halogen atom. Preferred ranges of the alkyl group and halogen atom are the same as the preferred ranges of the alkyl group and halogen atom defined by the group of substituents Z described below. l1 representing the number of $R^3$ is an integer of from 0 to 4, preferably from 1 to 4, and more preferably 3 or 4. $R^3$ is preferably an alkyl group, and more preferably a methyl group or an ethyl group.

$R^4$ and $R^5$ $R^4$ and $R^5$ each represent an alkyl group or a halogen atom, or are linked to each other to form a ring together with $X^2$. Preferred ranges of the alkyl group and halogen atom are the same as the preferred ranges of the alkyl group and halogen atom defined by the group of substituents Z described below. There are no particular limitations on the structure to which $R^4$ and $R^5$ are linked; however, the structure is preferably a single bond, —O—, or —S—. m1 and n1 representing the numbers of $R^4$ and $R^5$ are integers of from 0 to 4, preferably from 1 to 4, and more preferably 3 or 4.

When $R^4$ and $R^5$ each are an alkyl group, the alkyl group is preferably a methyl group or an ethyl group, and trifluoromethyl is also preferred.

$R^6$, $R^7$ and $R^8$ $R^6$, $R^7$ and $R^8$ represent a substituent. Herein, $R^7$ and $R^8$ may be linked to each other and form a ring. l2, m2, and n2 representing the numbers of substituents are integers of from 0 to 4, preferably from 0 to 2, and more preferably from 0 to 1.

$J^1$ $J^1$ represents a single bond or a divalent linking group. The linking group represents *—COO$^-$N$^+$R$^b$R$^c$R$^d$—** (wherein R$^b$ to R$^d$ each represent a hydrogen atom, an alkyl group, or an aryl group, and preferred ranges thereof are the same as the ranges disclosed by the group of substituents Z described below), *—SO$_3^-$N$^+$R$^e$R$^f$R$^g$—** (wherein R$^e$ to R$^g$ each represent a hydrogen atom, an alkyl group, or an aryl group, and preferred ranges thereof are the same as the ranges disclosed by the group of substituents Z described below), an alkylene group, or an arylene group. The symbol "*" represents the bonding site to the phenylene group side; and the symbol "**" represents the bonding site to the opposite side. $J^1$ is preferably a single bond, a methylene group, or a phenylene group; and more preferably a single bond.

$A^1$ $A^1$ represents a group selected from the group consisting of —COOH, —OH, —SH, and —S(=O)$_2$OH. A preferred range of the alkyl group is the same as the preferred range of the alkyl group explained by the group of substituents Z described below. $A^1$ is preferably —COOH or —OH.

Group of substituents Z includes:
an alkyl group (preferably an alkyl group having 1 to 30 carbon atoms, more preferably an alkyl group having 1 to 20 carbon atoms, and particularly preferably an alkyl group having 1 to 10 carbon atoms, and examples thereof include methyl, ethyl, isopropyl, tert-butyl, n-octyl, n-decyl, n-hexadecyl and the like), a cycloalkyl group (preferably a cycloalkyl group having 3 to 30 carbon atoms, more preferably a cycloalkyl group having 3 to 20 carbon atoms, and particularly preferably a cycloalkyl group having 3 to 10 carbon atoms, and examples thereof include cyclopropyl, cyclopentyl, cyclohexyl and the like), an alkenyl group (preferably an alkenyl group having 2 to 30 carbon atoms, more preferably an alkenyl group having 2 to 20 carbon atoms, and particularly preferably an alkenyl group having 2 to 10 carbon atoms, and examples thereof include vinyl, allyl, 2-butenyl, 3-pentenyl and the like), an alkynyl group (preferably an alkynyl group having 2 to 30 carbon atoms, more preferably an alkynyl group having 2 to 20 carbon atoms, and particularly preferably an alkynyl group having 2 to 10 carbon atoms, and examples thereof include propargyl, 3-pentynyl and the like), an aryl group (preferably an aryl group having 6 to 30 carbon atoms, more preferably an aryl group having 6 to 20 carbon atoms, and particularly preferably an aryl group having 6 to 12 carbon atoms, and examples thereof include phenyl, p-methylphenyl, naphthyl, anthranyl and the like), an amino group (including an amino group, an alkylamino group, an arylamino group, and a heterocyclic amino group; preferably an amino group having 0 to 30 carbon atoms, more preferably an amino group having 0 to 20 carbon atoms, and particularly preferably an amino group having 0 to 10 carbon atoms, and examples thereof include amino, methylamino, dimethylamino, diethylamino, dibenzylamino, diphenylamino, ditolylamino and the like), an alkoxy group (preferably an alkoxy group having 1 to 30 carbon atoms, more preferably an alkoxy group having 1 to 20 carbon atoms, and particularly preferably an alkoxy group having 1 to 10 carbon atoms, and examples thereof include methoxy, ethoxy, butoxy, 2-ethylhexyloxy and the like), an aryloxy group (preferably an aryloxy group having 6 to 30 carbon atoms, more preferably an aryloxy group having 6 to 20 carbon atoms, and particularly preferably an aryloxy group having 6 to 12 carbon atoms, and examples thereof include phenyloxy, 1-naphthyloxy, 2-naphthyloxy and the like), a heterocyclic oxy group (preferably a heterocyclic oxy group having 1 to 30 carbon atoms, more preferably a heterocyclic oxy group having 1 to 20 carbon atoms, and particularly preferably a heterocyclic oxy group having 1 to 12 carbon atoms, and examples thereof include pyridyloxy, pyrazyloxy, pyrimidyloxy, quinolyloxy and the like), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl and the like), an alkoxycarbonyl group (preferably an alkoxycarbonyl group having 2 to 30 carbon atoms, more preferably an alkoxycarbonyl group having 2 to 20 carbon atoms, particularly preferably an alkoxycarbonyl group having 2 to 12 carbon atoms, and examples thereof include methoxycarbonyl, ethoxycarbonyl and the like), an aryloxycarbonyl group (preferably an aryloxycarbonyl group having 7 to 30 carbon atoms, more preferably an aryloxycarbonyl group having 7 to 20 carbon atoms, particularly preferably an aryloxycarbonyl group having 7 to 12 carbon atoms, and examples thereof include phenyloxycarbonyl and the like), an acyloxy group (preferably an acyloxy group having 2 to 30 carbon atoms, more preferably an acyloxy group having 2 to 20 carbon atoms, particularly preferably an acyloxy group having 2 to 10 carbon atoms, and examples thereof include acetoxy, benzoyloxy and the like), an acylamino group (preferably an acylamino group having 2 to 30 carbon atoms, more preferably an acylamino group having 2 to 20 carbon atoms, particularly preferably an acylamino group having 2 to 10 carbon atoms, and examples thereof include acetylamino, benzoylamino and the like), an alkoxycarbonylamino group (preferably an alkoxycarbonylamino group having 2 to 30 carbon atoms, more preferably an alkoxycarbonylamino group having 2 to 20 carbon atoms, particularly preferably an alkoxycarbonylamino group having 2 to 12 carbon atoms, and examples thereof include methoxycarbonylamino and the like), an aryloxycarbonylamino group (preferably an aryloxycarbonylamino group having 7 to 30 carbon atoms, more preferably an aryloxycarbonylamino group having 7 to 20 carbon atoms, particularly preferably an aryloxycarbonylamino group having 7 to 12 carbon atoms, and examples thereof include phenyloxycarbonylamino and the like), a sulfonylamino group (preferably a sulfonylamino group having 1 to 30 carbon atoms, more preferably a sulfonylamino group having 1 to 20 carbon atoms, particularly preferably a sulfonylamino group having 1 to 12 carbon atoms, and examples thereof include methanesulfonylamino, benzenesulfonylamino and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms, and examples thereof include methylthio, ethylthio and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms, and examples thereof include diethylphosphoric acid amide, phenylphosphoric acid amide and the like), a hydroxyl group, a mercapto group, a halogen atom (for example, a fluorine atom, a chlorine atom, a bromine atom and an iodine atom, more preferably a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having a 3-membered to 7-membered ring, and may be an aromatic heterocyclic ring or a non-aromatic heterocyclic ring; examples of the heteroatoms that constitute the heterocyclic ring include a nitrogen atom, an oxygen atom, and a sulfur atom; preferably a heterocyclic group having 0 to 30 carbon atoms, and more preferably a heterocyclic group having 1 to 12 carbon atoms, and specific examples thereof include imidazolyl, pyridyl, quinolyl, furyl, thienyl, piperidyl, morpholino, benzoxazolyl, benzimidazolyl, benzothiazolyl, carbazolyl, azepinyl and the like), a silyl group (preferably a silyl group having 3 to 40 carbon atoms, more preferably a silyl group having 3 to 30 carbon atoms, and particularly preferably a silyl group having 3 to 24 carbon atoms, and examples thereof include trimethylsilyl, triphenylsilyl and the like), and a silyloxy group (preferably a silyloxy group having 3 to 40 carbon atoms, more preferably a silyloxy group having 3 to 30 carbon atoms, and particularly preferably a silyloxy group having 3 to 24 carbon atoms, and examples thereof include trimethylsilyloxy, triphenylsilyloxy and the like). These substituents may be further substituted by one or more substituents selected from the group of substituents Z.

Herein, in the present invention, when one structural site has a plurality of substituents, those substituents may be linked with each other to form a ring, or may be subjected to ring condensation partially or wholly with the above-described structural site to form an aromatic ring or an unsaturated heterocycle.

In regard to the polyimide compound that can be used in the present invention, the proportions of the various repeating units represented by Formulas (I), (II-a), (II-b), (III-a) and (III-b) are not particularly limited, and the proportions are appropriately adjusted in consideration of gas permeability and separation selectivity in accordance with the purposes of gas separation (recovery ratio, purity and the like).

In the polyimide compounds that can be used in the present invention, the ratio ($E_{II}/E_{III}$) of the total number of moles ($E_{III}$) of the various repeating units of Formulas (III-a) and (III-b) with respect to the total number of moles ($E_{II}$) of the various repeating units of Formulas (II-a) and (II-b) is preferably 5/95 to 95/5, more preferably 10/90 to 80/20, and even more preferably 20/80 to 60/40.

The molecular weight of the polyimide compound used in the present invention is, as the weight average molecular weight, preferably 10,000 to 1,000,000, more preferably 15,000 to 500,000, and further preferably 25,000 to 200,000.

Unless specified otherwise, the molecular weight and the degree of dispersion are defined as the values obtained by measurement in accordance with a GPC (Gel Permeation Chromatography). The molecular weight is defined as polystyrene-converted weight-average molecular weight. The gel charged into the column used in the GPC method is preferably a gel having an aromatic compound as a repeating unit, and examples thereof include a gel made of styrene-divinylbenzene copolymers. The column is preferably used in the form where 2 to 6 columns are connected. Examples of a solvent used include ether-based solvents such as tetrahydrofuran, and amide-based solvents such as N-methylpyrrolidinone. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus, the measurement can be carried out further efficiently. The measurement temperature is preferably carried out at from 10° C. to 50° C., and most preferably from 20° C. to 40° C. A column and a carrier to be used can be properly selected, according to the property of a polymer compound to be measured.

<Synthesis of Polyimide Compound>

The polyimide compound that can be used in the present invention can be synthesized by subjecting a particular bifunctional acid anhydride (tetracarboxylic acid dianhydride) and a particular diamine to a polycondensation reaction. Regarding that method, techniques described in general literatures (for example, Toshio Imai and Rikio Yokota, ed., "Saishin Poliimido—Kiso to Oyo—(Latest Polyimides—Fundamentals and Application —)", NTS, Inc., Aug. 25, 2010, pp. 3-49, and the like) can be appropriately selected.

In regard to the synthesis of the polyimide compound that can be used in the present invention, at least one tetracarboxylic acid dianhydride used as a raw material is represented by Formula (VI). It is preferable that all of the tetracarboxylic acid dianhydrides used as raw materials are represented by Formula (VI).

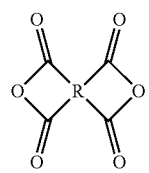

Formula (VI)

In Formula (VI), R has the same meaning as R in Formula (I).

Specific examples of the tetracarboxylic acid dianhydride that can be used in the present invention include the following compounds.

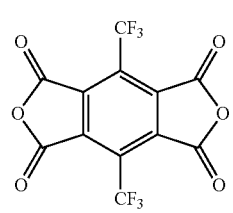

Anhydride-1

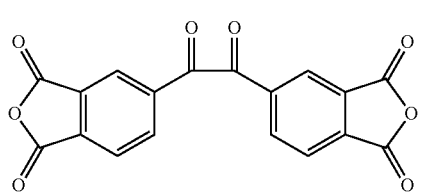

Anhydride-2

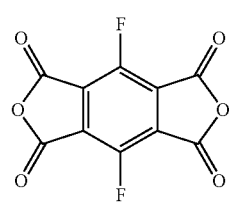

Anhydride-3

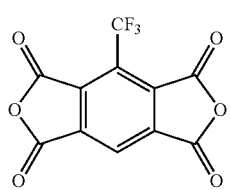

Anhydride-4

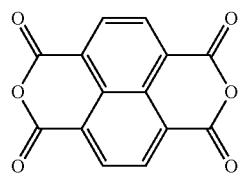

Anhydride-5

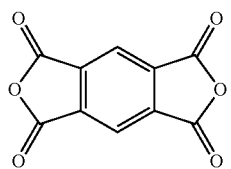

Anhydride-6

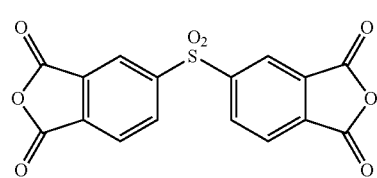

Anhydride-7

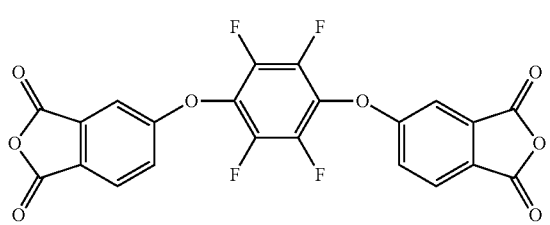

Anhydride-8

-continued
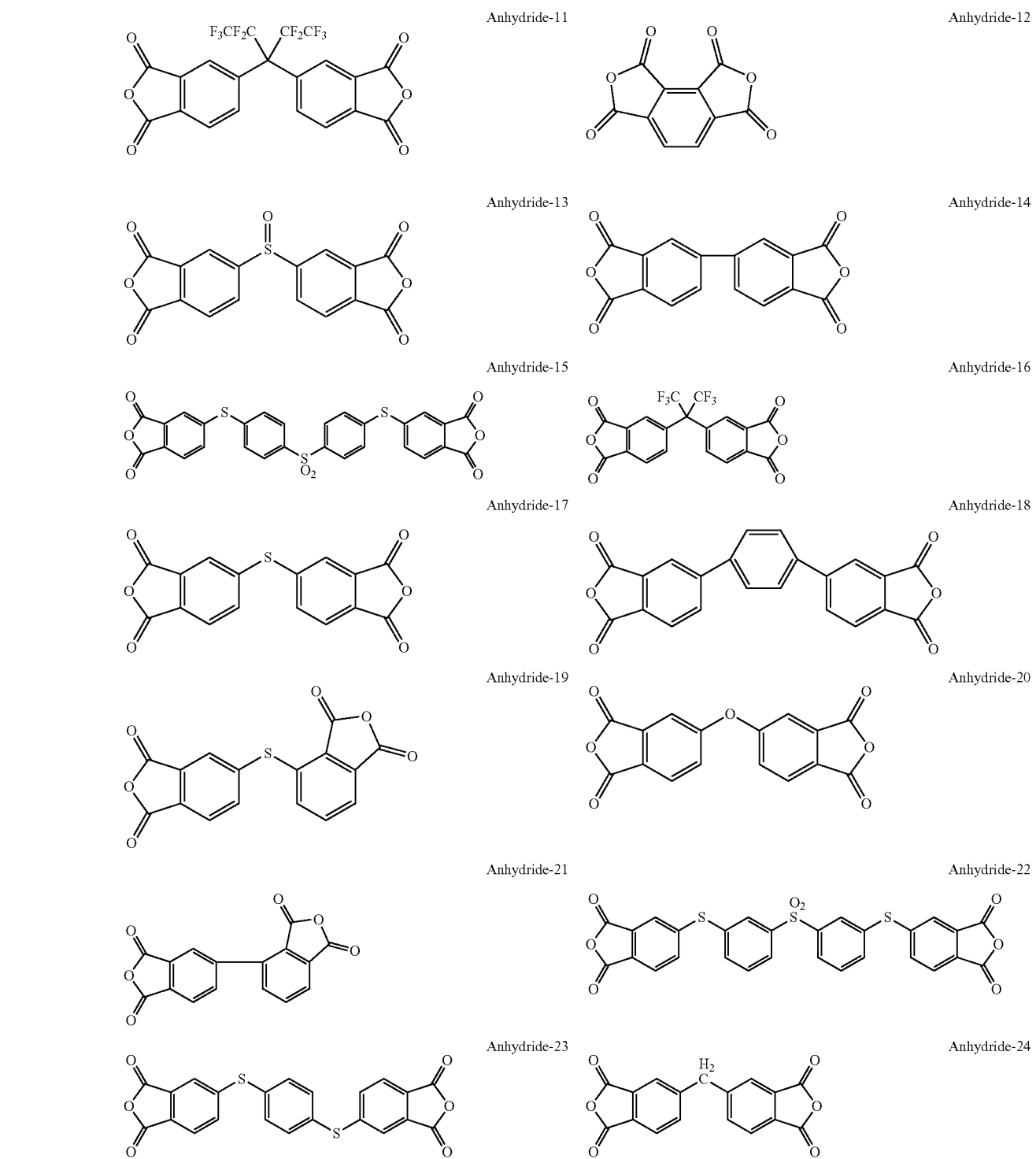

-continued
Anhydride-25
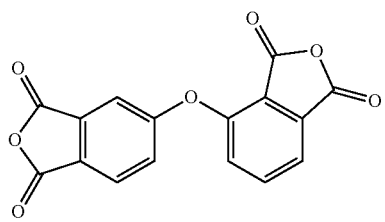
Anhydride-26
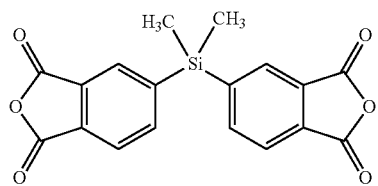
Anhydride-27
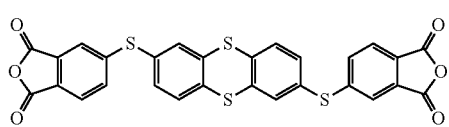
Anhydride-28
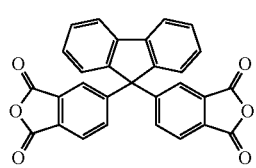
Anhydride-29
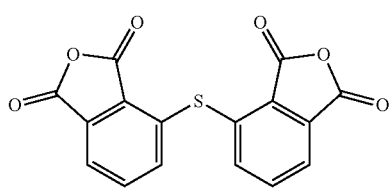
Anhydride-30
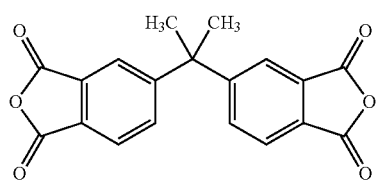
Anhydride-31
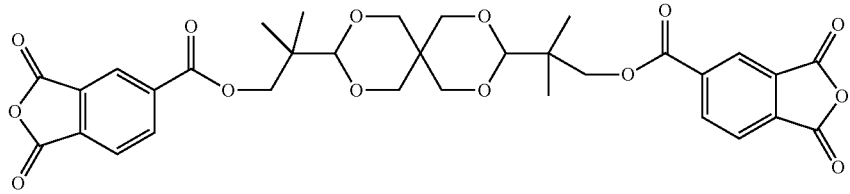
Anhydride-32
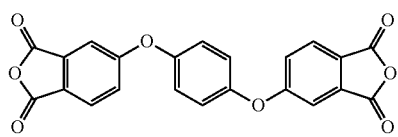
Anhydride-33
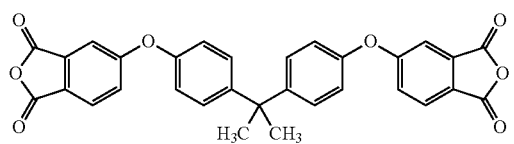
Anhydride-34
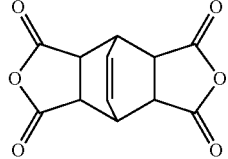
Anhydride-35
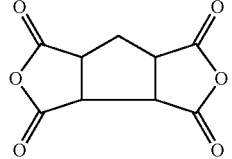
Anhydride-36
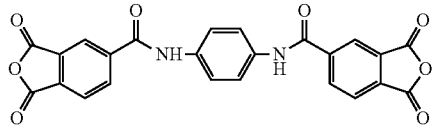
Anhydride-37
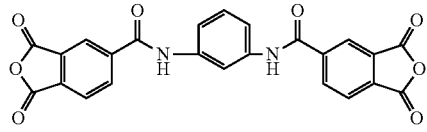
Anhydride-38
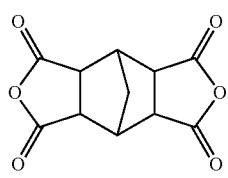
Anhydride-39
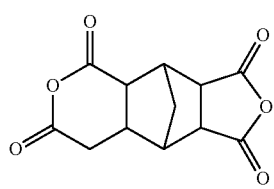

Anhydride-40

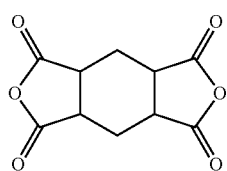

In regard to the synthesis of the polyimide compound that can be used in the present invention, at least one diamine compound used as a raw material is represented by Formula (VII-a) or (VII-b), and at least one is represented by Formula (VIII-a) or (VIII-b). It is preferable that all of the diamine compounds used as raw materials are represented by any one of Formulas (VII-a), (VII-b), (VIII-a) and (VIII-b).

Formula (VII-a)

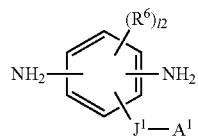

Formula (VII-b)

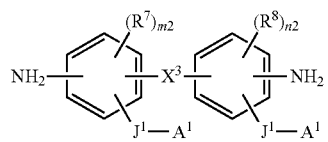

Formula (VIII-a)

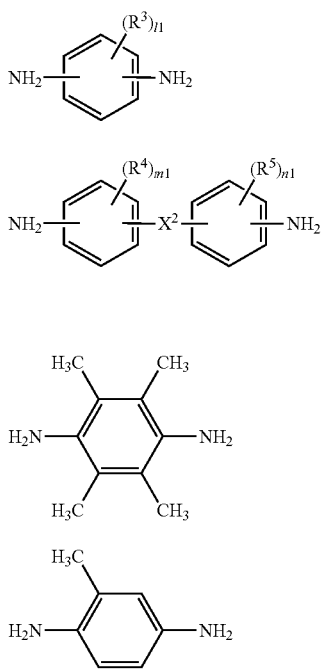

Formula (VIII-b)

The various symbols in Formulas (VII-a) and (VII-b) each have the same meanings as the same symbols used in Formulas (II-a) and (II-b). Also, the various symbols in Formulas (VIII-a) and (VIII-b) each have the same meanings as the same symbols used in Formulas (III-a) and (III-b).

Specific examples of the diamine compound that can be used in the present invention include the following compounds.

Diamine-1

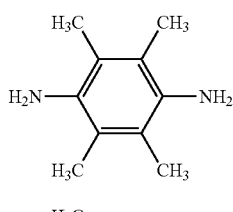

Diamine-2

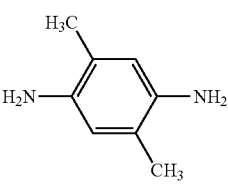

Diamine-3

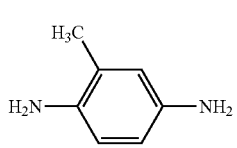

Diamine-4

Diamine-5

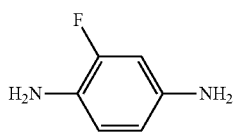

Diamine-6

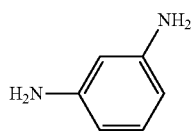

Diamine-7

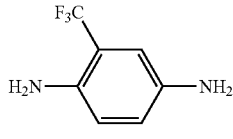

Diamine-8

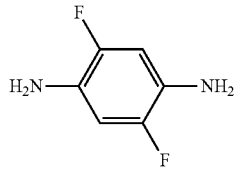

Diamine-9

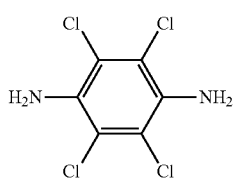

Diamine-10

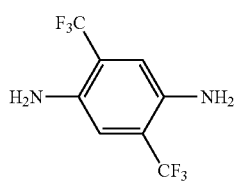

-continued
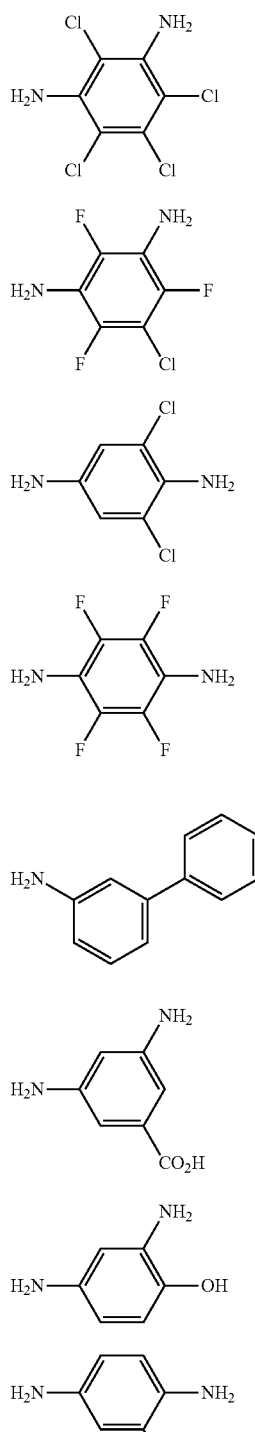
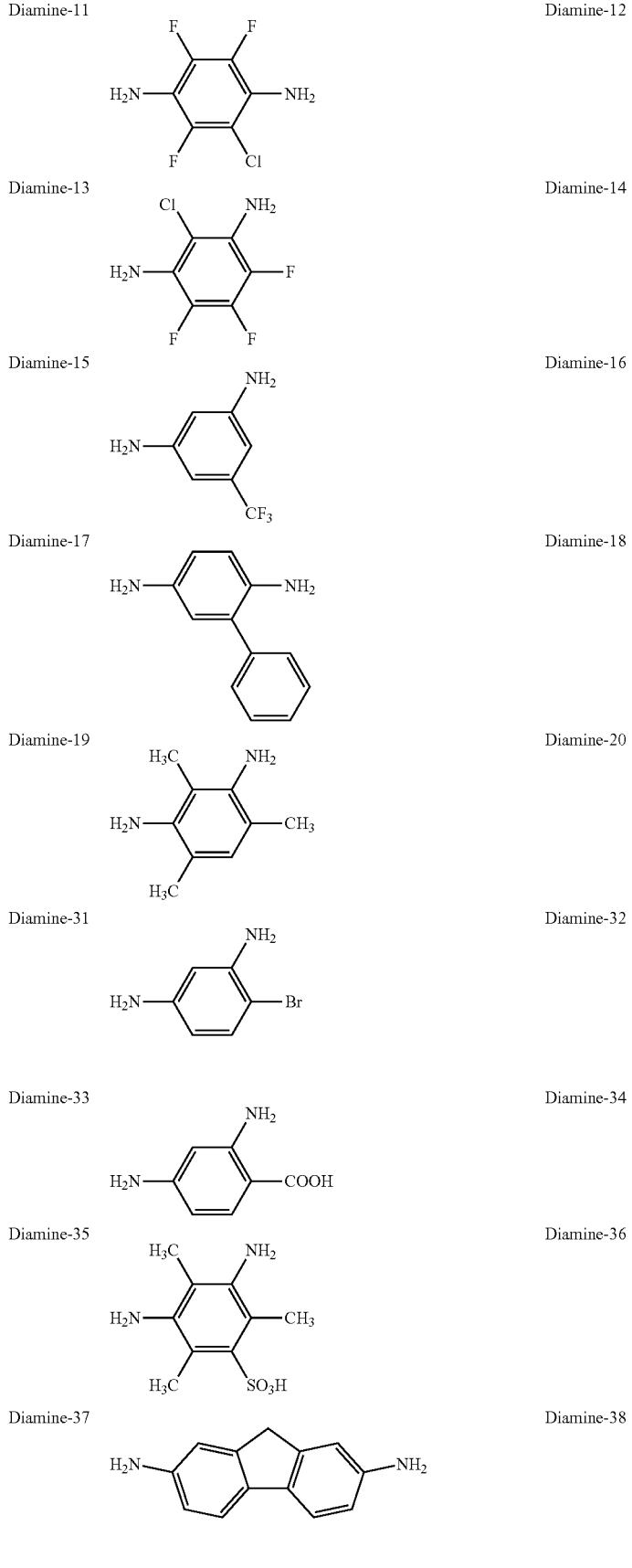

-continued
Diamine-39 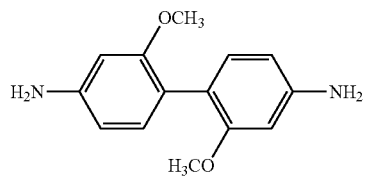
Diamine-40 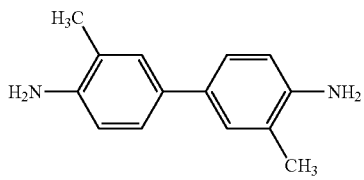
Diamine-41 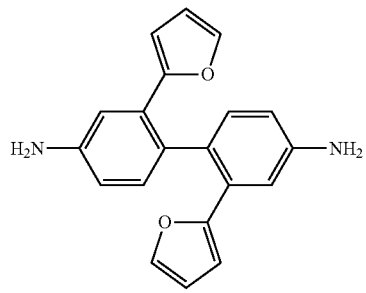
Diamine-42 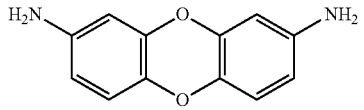
Diamine-43 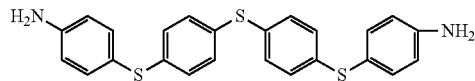
Diamine-44 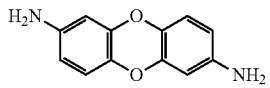
Diamine-45 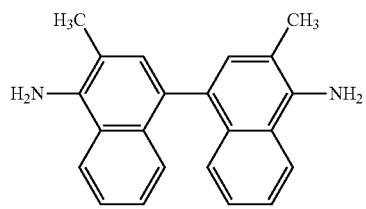
Diamine-46 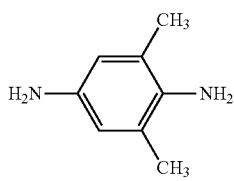
Diamine-47 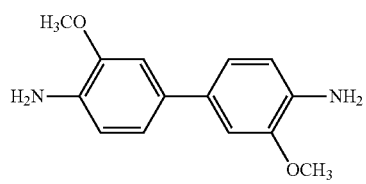
Diamine-48 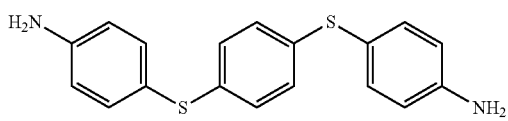
Diamine-49 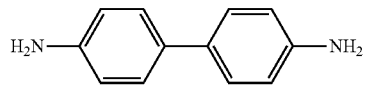
Diamine-50 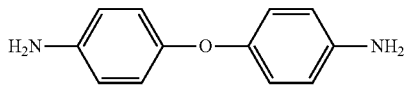
Diamine-51 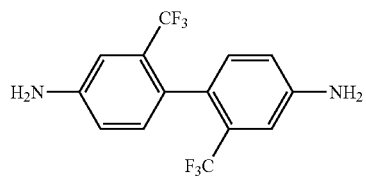
Diamine-52 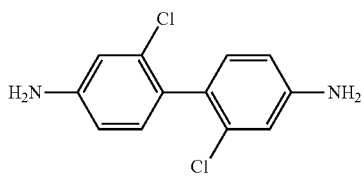
Diamine-53 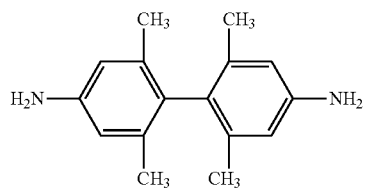
Diamine-54 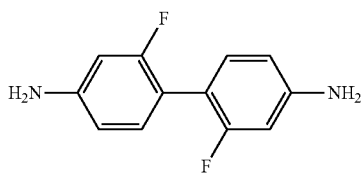

-continued
| | |
|---|---|
| Diamine-55 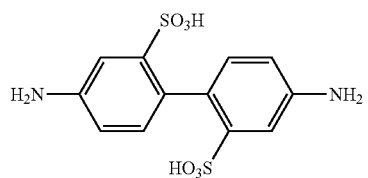 | Diamine-56 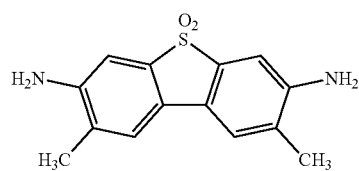 |
| Diamine-57 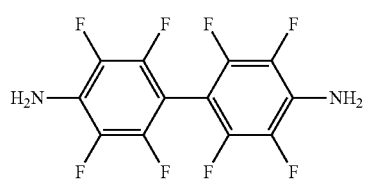 | Diamine-58 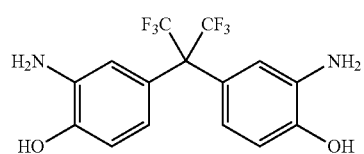 |
| Diamine-59 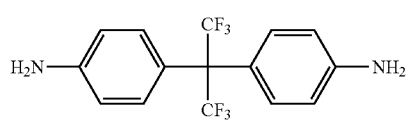 | Diamine-60 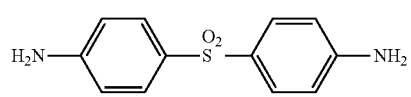 |
| Diamine-61 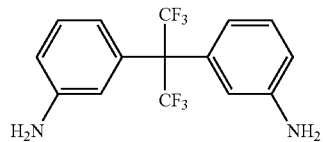 | Diamine-62 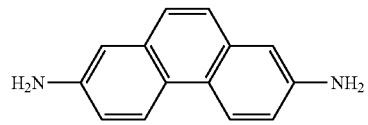 |
| Diamine-63 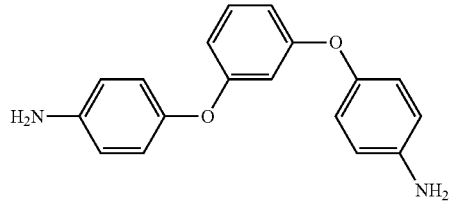 | Diamine-64 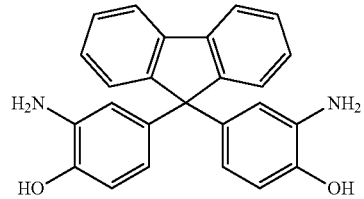 |
| Diamine-65 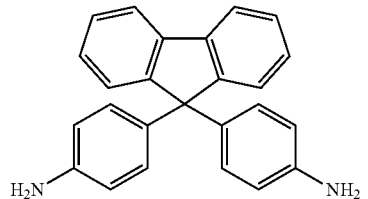 | Diamine-66 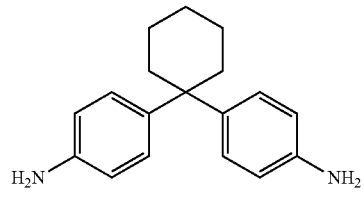 |
| Diamine-67 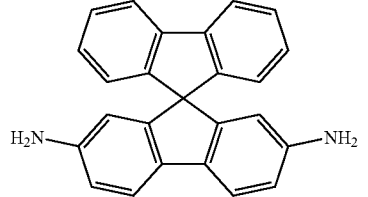 | Diamine-68 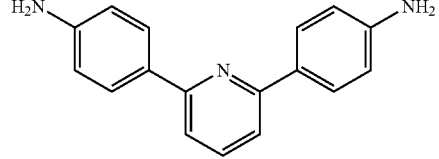 |
| Diamine-69 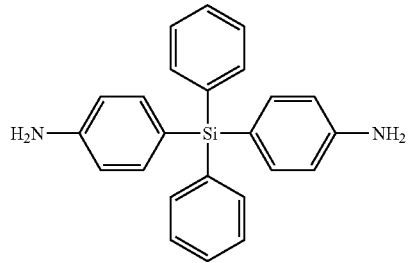 | Diamine-70 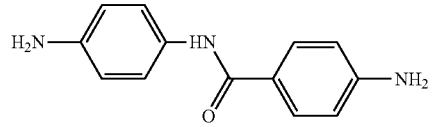 |

Preferred specific examples of the polyimide compound that can be used in the present invention include the following compounds. However, the present invention is not intended to be limited to these. Meanwhile, in the following formulas, "100", "x" or "y" is a number representing the existence ratio (molar ratio) of each repeating unit in the polyimide compound, that is, the copolymerization ratio (molar ratio), and is not intended to represent the number of each repeating units connected in sequence. Examples of "x", "y" and the weight average molecular weight are presented in the following Table 1. In the polyimide compound that can be used in the present invention, y is not intended to be 0.

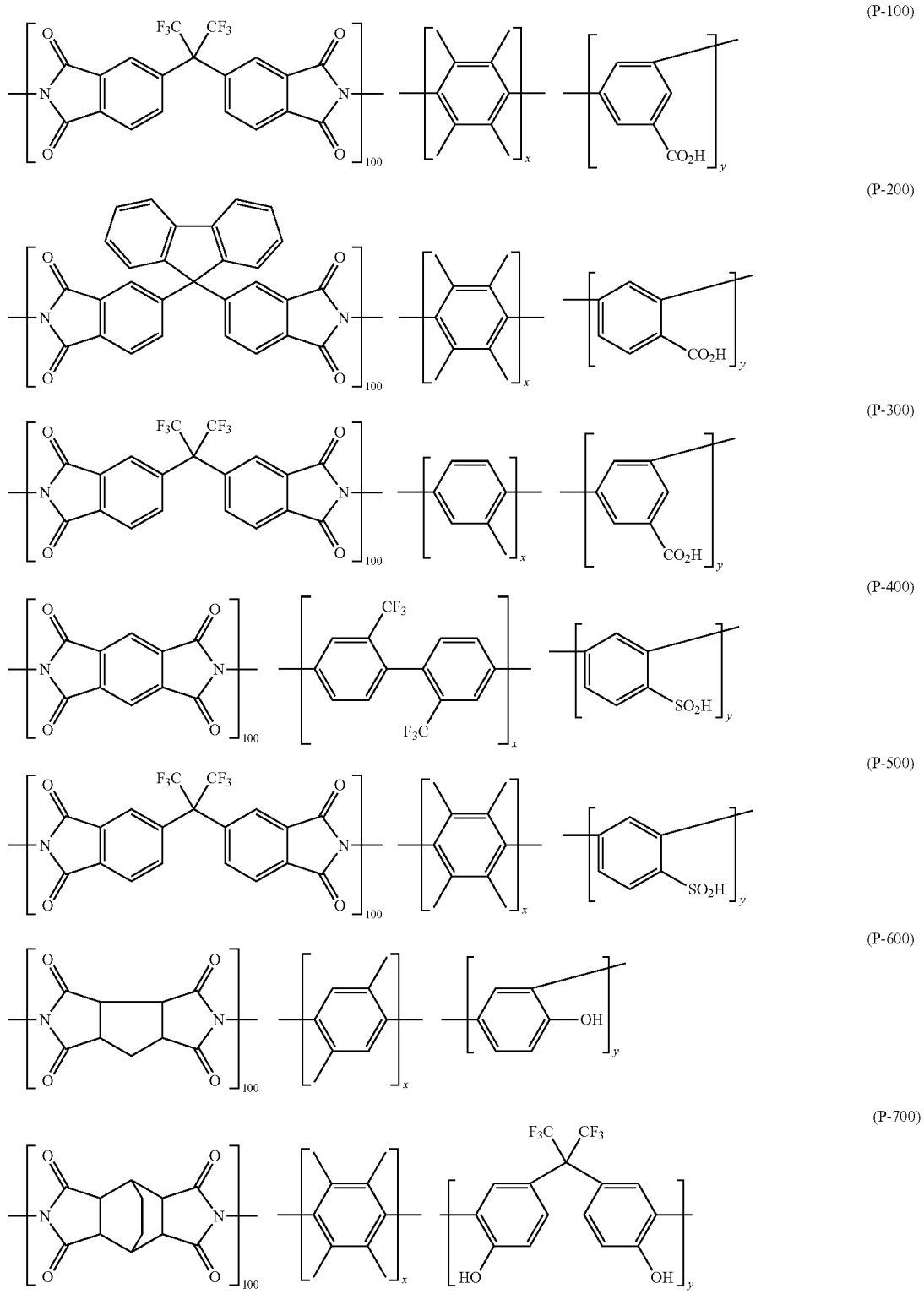

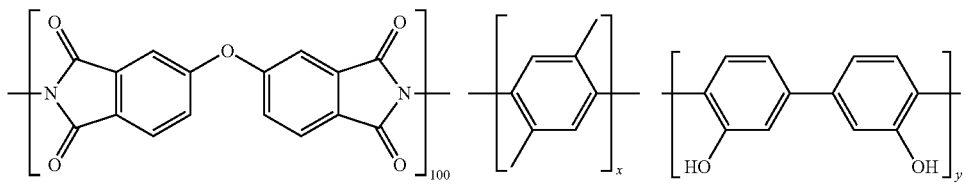
(P-800)

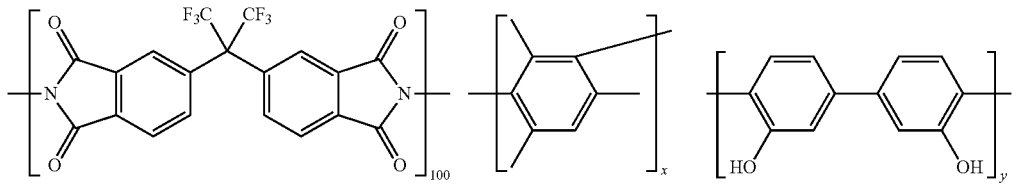
(P-900)

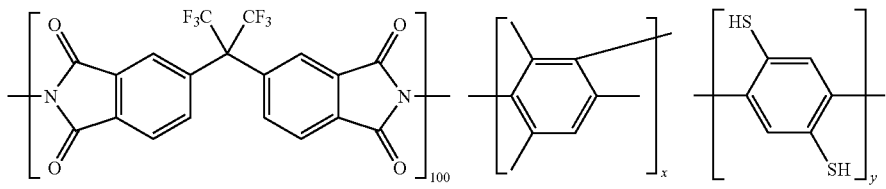
(P-1000)

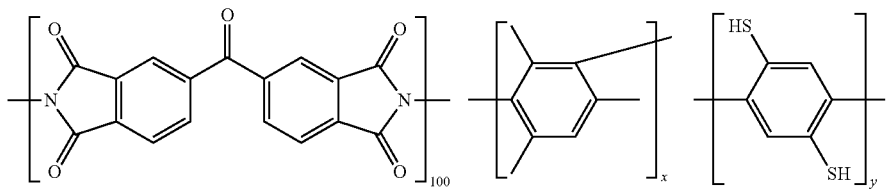
(P-1100)

TABLE 1

| Polymer | Copolymerization ratio | | Weight average molecular weight |
| --- | --- | --- | --- |
| | x | y | |
| P-100 | 30.0000 | 70.0000 | 132,000 |
| P-200 | 40.0000 | 60.0000 | 168,000 |
| P-300 | 60.0000 | 40.0000 | 165,000 |
| P-400 | 10.0000 | 90.0000 | 158,000 |
| P-500 | 20.0000 | 80.0000 | 128,000 |
| P-600 | 50.0000 | 50.0000 | 155,000 |
| P-700 | 70.0000 | 30.0000 | 112,500 |
| P-800 | 30.0000 | 70.0000 | 158,000 |
| P-900 | 20.0000 | 80.0000 | 128,000 |
| P-1000 | 60.0000 | 40.0000 | 150,000 |
| P-1100 | 40.0000 | 60.0000 | 117,000 |

Regarding the monomers represented by the above Formulas (VI), (VII-a), (VII-b), (VIII-a) and (VIII-b), oligomers or prepolymers may also be used. The polymerization product for obtaining a polymer compound may be a copolymer in the form of any of a block copolymer, a random copolymer, or a graft copolymer. However, it is particularly preferable to use a block copolymer or a graft copolymer from the viewpoints of viscosity and compatibility.

The polyimide compound that can be used in the present invention can be obtained by mixing the various raw materials described above in a solvent, and subjecting the raw materials to a polycondensation reaction by an ordinary method.

The solvent is not particularly limited, and examples thereof include ester-based organic solvents such as methyl acetate, ethyl acetate, and butyl acetate; aliphatic ketones such as acetone, methyl ethyl ketone, methyl isobutyl ketone, diacetone alcohol, cyclopentanone, and cyclohexanone; ether-based organic solvents such as ethylene glycol dimethyl ether, dibutyl butyl ether, tetrahydrofuran, methyl cyclopentyl ether, and dioxane; amide-based organic solvents such as N-methylpyrrolidone, 2-pyrrolidone, dimethylformamide, dimethylimidazolidinone, and dimethylacetamide; and sulfur-containing organic solvents such as dimethyl sulfoxide and sulfolane. These organic solvents are appropriately selected so as to enable dissolution of the reaction substrates such as a tetracarboxylic acid dianhydride, a diamine compound, a polyamic acid as a reaction intermediate, and a polyimide compound as the final product. Preferred examples include ester-based solvents (preferably butyl acetate), aliphatic ketones (preferably methyl ethyl ketone, methyl isobutyl ketone, diacetone alcohol, cyclopentanone, and cyclohexanone), ether-based solvents (preferably diethylene glycol monomethyl ether and methyl cyclopentyl ether), amide-based solvents, and sulfur-containing solvents (preferably dimethyl sulfoxide and sulfolane). These solvents can be used singly, or in combination of two or more kinds thereof.

There are no particular limitations on the polymerization reaction temperature, and any temperature that can be usually employed in the synthesis of a polyimide compound can be employed. Specifically, the polymerization reaction temperature is preferably −40° C. to 60° C., and more preferably −30° C. to 50° C.

The polyimide compound is obtained by imidating the polyamic acid produced by the above-described polymerization reaction through a dehydration cyclization reaction in the molecule. Regarding the method for dehydration cyclization, reference can be made to the methods described in general literatures (for example, Toshio Imai and Rikio Yokota, ed., "Saishin Poliimido—Kiso to Oyo—(Latest Polyimides—Fundamentals and Application —)", NTS, Inc., pp. 3-49, and the like). For example, techniques such as a thermal imidation method of heating at 120° C. to 200° C., and causing the system to react while removing water that is produced as a side product from the system; and so-called chemical imidation of using a dehydration condensating agent such as acetic anhydride, dicyclohexylcarbodiimide, or triphenyl phosphite in the co-presence of an alkaline catalyst such as pyridine, triethylamine or DBU, are suitably used.

<Concentration>

In the present invention, the total concentrations of the tetracarboxylic acid dianhydride and the diamine compound in the polymerization reaction liquid for the polyimide compound are not particularly limited. However, the total concentrations are preferably 5% to 70% by mass, more preferably 5% to 50% by mass, and further preferably 5% to 30% by mass.

<Crosslinked Polyimide Resin>

In the gas separation composite membrane of the present invention, the crosslinked polyimide resin that constitutes the gas separating layer has a structure in which a divalent to tetravalent metal atom is employed as a central metal, and 2 to 4 molecules of the above-described polyimide compound is coordinated (bonded) with this central metal. The polyimide compound coordinates the central metal via an oxygen atom or a sulfur atom. More preferably, the polyimide compound coordinates with the central metal via an active hydrogen-containing group carried by the polyimide compound, for example, an oxygen atom or a sulfur atom in —COOH, —OH, —SH and —S(=O)$_2$OH from which a hydrogen atom has been eliminated. When the number of coordinates (Np) of the polyimide compound to the central metal is smaller than the number of possible coordinates (Nq) to the central metal, the central metal atom has (Nq-Np) ligands selected from an alkoxy group, an aryloxy group, a carboxylate group, a sulfate group, a cyano group, an ammonium group, a phosphate group, a β-diketone, a β-keto ester, and a halogen atom. The ligand is a ligand carried by the metal complex that will be described below.

The polyimide compounds coordinating with the central metal may be identical or different.

The crosslinked polyimide resin in the present invention may have a structure having plural central metal atoms. In that case, the plural central metal atoms are linked through the polyimide chains of the polyimide compound. That is, when the crosslinked polyimide resin according to the present invention has plural central metal atoms, a portion or the entirety of the polyimide compound exists as a bridging ligand. The number of central metal atoms for the crosslinked polyimide resin according to the present invention is not particularly limited, and the number is preferably 1 to 300, and more preferably 1 to 200 from the viewpoint of suppressing precipitation during liquid preparation, and more preferably 1 to 150. The plural central metal atoms may be identical or different from each other.

The central metal atom is a divalent to tetravalent metal atom, and is preferably a trivalent or tetravalent, and more preferably a trivalent, metal atom. Examples of the central metal include Be, Mg, Ca, Sc, Y, Ti, Zr, V, Cr, Mo, Mn, Fe, Co, Ni, Cu, Zn, B, Al, Ga, and In. Among them, Al, Ga or In is preferred. Usually, the same number of polyimide resins as the valence of the metal atom can be employed for coordination. Therefore, in the structure of the crosslinked polyimide resin according to the present invention, the number of polyimide compounds coordinating with the central metal is usually "2 to (valence of the central metal)". However, the present invention is not intended to be limited to this form.

According to the present invention, the metal crosslinking of the polyimide resin is preferably carried out together with the formation of a gas separating layer. The details are explained in the following section [Method of producing gas separation composite membrane].

[Method of Producing Gas Separation Composite Membrane]

According to the present invention, the production of the gas separation membrane containing the crosslinked polyimide is preferably carried out by simultaneous conduction of the formation of crosslinking and the formation of the gas separating layer by preparing a coating liquid by mixing at least one kind or two or more kinds of the particular polyimide compound and one kind or two or more kinds of a metal complex in a solvent, and applying this coating liquid in the form of a thin layer on the supporting layer for the gas separation composite membrane. At that time, in the coating liquid containing the polyimide compound and the metal complex, it is preferable that a ligand exchange reaction does not proceed, or the rate of progress is sufficiently suppressed to the extent that gelling does not occur before coating. When the concentrations of the polyimide compound and the metal complex in the coating liquid are suppressed to lower levels than certain concentrations, the progress of the ligand exchange reaction in the coating liquid can be suppressed to a predetermined level, and a low viscosity state capable of application of a thin layer can be maintained. Specifically, the concentration of the polyimide compound in the coating liquid at the time of application is preferably adjusted to 0.1% to 20.0% by mass, more preferably to 0.2% to 10.0% by mass, and further preferably to 0.5% to 5.0% by mass. Furthermore, the concentration of the metal complex in the coating liquid at the time of application is preferably adjusted to 0.2% to 30% by mass, more preferably to 0.5% to 20% by mass, and further preferably to 1% to 10% by mass, relative to 100% by mass of the concentration of the polyimide compound.

The central metal of the metal complex is a divalent to tetravalent metal atom, and examples of the metal atom include Be, Mg, Ca, Sc, Y, Ti, Zr, V, Cr, Mo, Mn, Fe, Co, Ni, Cu, Zn, B, Al, Ga, and In. Among them, Al, Ga or In is preferred.

It is preferable that the metal complex has two or more ligands selected from the group consisting of an alkoxy group, an aryloxy group, a carboxylate group, a sulfate group, a cyano group, an ammonium group, a phosphate group, a β-diketone, a β-keto ester, and a halogen atom; and it is more preferable that the metal complex has two or more ligands selected from the group consisting of a β-diketone and a β-keto ester. The number of ligands is usually 2 to 4, which corresponds to the valence of the central metal.

Specific examples of the β-diketone and the β-keto ester include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, and 5-methylhexanedione. Among these, acetylacetone is particularly preferred.

As described below, the at least two ligands are transferred to a polyimide compound containing an active hydrogen group by ligand exchange in the co-presence of the polyimide compound. Thereby, the metal-crosslinked structure of the polyimide compound is formed.

Specific examples of the metal complex include aluminum acetylacetonate, gallium acetylacetonate, indium acetylacetonate, zirconium acetylacetonate, cobalt acetylacetonate, calcium acetylacetonate, nickel acetylacetonate, zinc acetylacetonate, magnesium acetylacetonate, ferric chloride, copper(II) acetate, aluminum isopropoxide, and titanium isopropoxide.

The coating liquid containing the particular polyimide compound and the metal complex is such that when the coating liquid is applied in the form of a thin layer on the gas permeable support, the ligand exchange reaction occurs rapidly along with rapid evaporation of the solvent, and the metal-crosslinked structure is formed. Thereby, the gas separating layer formed from the polyimide resin having the metal-crosslinked structure can be formed on the support.

From the viewpoint of increasing gas permeability, it is preferable that the gas separating layer of the composite membrane of the present invention is a thin layer. The thickness of the gas separating layer is usually 10 μm or less, preferably 5 μm or less, more preferably 3 μm or less, further preferably 2 μm or less, still further preferably 1 μm or less, and still more further preferably 0.5 μm or less. In order to obtain a gas separation membrane having the preferred thickness, the coating liquid should be applied in the form of a thin layer. Since the coating liquid is prepared in a nature capable of thin layer coating as described above, thin layer coating can be easily carried out. Meanwhile, the thickness of the gas separating layer is usually 0.01 μm or more, and from a practical viewpoint, the thickness is preferably 0.03 μm or more.

When the coating liquid is applied in the form of a thin layer, the specific interfacial area is increased, and the rate of evaporation of the solvent is markedly increased. Along with this rapid evaporation of the solvent, the concentrations of the polyimide resin and the metal complex are instantaneously increased. As a result, ligand exchange occurs rapidly. Thus, the metal-crosslinked polyimide structure is rapidly formed. Since the formation of the metal-crosslinked polyimide proceeds rapidly after the application of the coating liquid, penetration of the coating liquid into the porous support does not easily occur (gels first before penetration). As a result, a gas separating layer that is more uniform and has fewer defects can be formed.

In the gas separation composite membrane thus obtained, the coefficient of variation of the thickness of the gas separating layer is preferably 1 or less, more preferably 0.5 or less, and further preferably 0.3 or less. The coefficient of variation is a value calculated by randomly selecting ten sites of membrane thickness measurement that are separated apart by 1 cm or more in the gas separating layer that constitutes the gas separation membrane, and performing membrane thickness measurement at the relevant sites.

<Organic Solvent>

As medium of the coating liquid, the organic solvent is not particularly limited, and specific examples include hydrocarbon-based organic solvents such as n-hexane and n-heptane; ester-based organic solvents such as methyl acetate, ethyl acetate, and butyl acetate; lower alcohols such as methanol, ethanol, n-propanol, isopropanol, n-butanol, isobutanol and tert-butanol; aliphatic ketones such as acetone, methyl ethyl ketone, methyl isobutyl ketone, diacetone alcohol, cyclopentanone, and cyclohexanone; ether-based organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butylether, tetrahydrofuran, methyl cyclopentyl ether, and dioxane; N-methylpyrrolidone, 2-pyrrolidone, dimethylformamide, dimethyl imidazolidinone, dimethyl sulfoxide, dimethyl acetamide and the like. These organic solvents are suitably selected within the range in which the solvents do not exert a harmful influence, such as corrosion of the support, and preferably an ester-based solvent (preferably butyl acetate), an alcohol-based solvent (preferably methanol, ethanol, isopropanol, and isobutanol), aliphatic ketones (preferably methyl ethyl ketone, methyl isobutyl ketone, diacetone alcohol, cyclopentanone, and cyclohexanone) or an ether type solvent (preferably ethylene glycol, diethylene glycol monomethyl ether, and methyl cyclopentylether); and further preferably an aliphatic ketone-based solvent, an alcohol-based solvent or an ether-based solvent. These solvents may be used alone or in combination of two or more types.

<Other Components and the Like>

The gas separation membrane of the present invention may contain a variety of polymer compounds in order to adjust membrane physical properties. Examples of the polymer compounds include acrylic polymers, polyurethane resins, polyamide resins, polyester resins, epoxy resins, phenol resins, polycarbonate resins, polyvinyl butyral resins, polyvinyl formal resins, shelac, vinylic resins, acrylic resins, rubber-based resins, waxes, and other natural resins. These polymer compounds may be used alone or in combination of two or more kinds thereof.

Moreover, a nonionic surfactant, a cationic surfactant, an organic fluoro surfactant or the like may be added in order to adjust liquid physical properties.

Specific examples of the surfactant include anionic surfactants such as alkylbenzene sulfonates, alkyl naphthalene sulfonates, higher fatty acid salts, sulfonates of a higher fatty acid ester, ester sulfates of a higher alcohol ether, sulfonates of a higher alcohol ether, alkylcarboxylates of a higher alkylsulfone amide, and alkylphosphates; and nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters. Other examples include amphoteric surfactants such as alkyl betaine or amide betaine, silicone-based surfactants, fluorine-based surfactants and the like. The surfactant may be suitably selected from conventionally known surfactants and derivatives thereof.

Specific examples of polymer dispersants include polyvinyl pyrrolidone, polyvinyl alcohol, polyvinyl methylether, polyethylene oxide, polyethylene glycol, polypropylene glycol, and polyacryl amide. Among them, polyvinyl pyrrolidone is preferably used.

The conditions to form the gas separation membrane of the present invention are not particularly limited, but the temperature is preferably from −30° C. to 100° C., more preferably from −10° C. to 80° C., and particularly preferably from 5° C. to 50° C.

In the present invention, gas such as air or oxygen may coexist during the formation of membrane, but the formation is preferably performed under an inert gas atmosphere.

[Method of Separating Gas Mixture]

The method of separating a gas of the present invention is a method including selectively causing carbon dioxide to permeate from a mixed gas containing carbon dioxide and methane. The pressure at the time of gas separation is preferably 10 to 100 atmospheric pressure, and more preferably 20 to 70 atmospheric pressure. Furthermore, the gas separation temperature is preferably −30° C. to 90° C., and more preferably 15° C. to 70° C.

[Gas Separation Module and Gas Separation Apparatus]

The gas separation membrane of the present invention is a composite membrane combined with a porous support, and a gas separation module can be produced using this composite membrane. Examples of the module include a spiral type module, a hollow fiber type module, a pleat type module, a tubular type module, and a plate and frame type module.

Furthermore, a gas separation apparatus having a means for separation and collection or separation and purification of gas can be obtained using the gas separation composite membrane or the gas separation membrane module of the present invention. Moreover, the gas separation composite membrane of the present invention may be applied to an apparatus for separating and recovering gas using a membrane/absorption hybrid method in conjunction with an absorption solution, for example, as described in JP-A-2007-297605.

EXAMPLES

Hereinafter, the present invention will be described in more detail with reference to examples, but the present invention is not limited to these examples. Meanwhile, unless particularly stated otherwise, the units "parts" and "percent (%)" in the descriptions are on a mass basis.

Synthesis Example

Synthesis of Polymer (P-101)

In a 1-L three-necked flask, 123 mL of N-methylpyrrolidone and 54.97 g (0.124 mol) of 6FDA (manufactured by Tokyo Chemical Industry Co., Ltd.) were introduced and dissolved at 40° C. While the solution was stirred under a nitrogen gas flow, 84.0 mL of N-methylpyrrolidone solution of 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid was added dropwise to the flask over 30 minutes while the temperature inside the system was maintained at 40° C. The reaction liquid was stirred for 2.5 hours at 40° C., and then 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added thereto. The mixture was further stirred for 3 hours at 80° C. Thereafter, the reaction liquid was diluted by adding 676.6 mL of acetone to the reaction liquid. In a 5-L stainless steel vessel, while 1.15 L of methanol and 230 mL of acetone were introduced and stirred, the acetone dilution of the reaction liquid was added dropwise. Polymer crystals thus obtained were suction filtered and dried by blowing air at 60° C., and thus 50.5 g of polymer (P-101) was obtained. This P-101 was a polymer having the aforementioned exemplary polyimide compound P-100 adjusted to (x:y)=20:80. The weight average molecular weight of P-101 was 132,000.

The various polymers described in Table 2 were synthesized according to the Synthesis Example described above. In Table 2, the main skeletons of P-201 to P-801 had the structures respectively represented by the above-described exemplary polyimide compounds P-100 to P-800, and the ratio (x:y) was adjusted to the ratios indicated in Table 2. Similarly, the main skeletons of P-202 and P-302 had the structures respectively represented by the above-described exemplary polyimide compounds P-200 and P-300, and the ratio (x:y) was adjusted to the ratios indicated in Table 2.

[Example 1] Production of Composite Membrane

Production of Composite Membrane 101:

In a 50-mL brown vial, 0.6 g of the polymer (P-101) and 8.6 g of tetrahydrofuran were mixed, and the mixture was stirred for 30 minutes. Subsequently, 38 mL of a tetrahydrofuran solution of 0.0180 g of aluminum acetylacetonate was added thereto, and the resulting mixture was stirred for another 30 minutes. A polyacrylonitrile porous membrane (manufactured by GMT Membrantechnik GmbH) was placed on a clean glass plate which measured 10 cm on all of the four sides, and the polymer liquid was cast thinly on the surface of the porous supporting membrane using an applicator. The resultant was covered with a polypropylene lid, and was left to stand overnight. Subsequently, the membrane was dried for 2 hours at 70° C. in an air blowing dryer (composite membrane 101). The thickness of the polymer (P-101) layer was about 0.1 μm, and the thickness of the polyacrylonitrile porous membrane including a nonwoven fabric was about 170 μm.

[Examples 2 to 24] Production of Composite Membranes

The composite membranes of Examples 2 to 24 indicated in Table 2 were produced by changing the polyimide compound and the metal complex used in the composite membrane 101 to the polyimide compound and the metal complex as indicated in Table 2. Meanwhile, in the metal complexes of Table 2, "acac" represents acetylacetonate, and "OiPr" represents isopropoxide.

[Comparative Examples 1 to 5] Production of Composite Membranes

The composite membranes of Comparative Examples 1 to 5 indicated in Table 2 were produced by changing the polyimide compound and the metal complex used in the composite membrane 101 to the polyimide compound and the metal complex as indicated in Table 2.

[Comparative Example 6] Production of Composite Membrane

A polymer having the following structure was synthesized by a method similar to the method described in US 2010/0326273 A1, and a cellulose-based crosslinked organic-inorganic hybrid membrane c11 was produced using this polymer. The gas separating layer of c11 was made into the minimum thickness that was free of membrane defects.

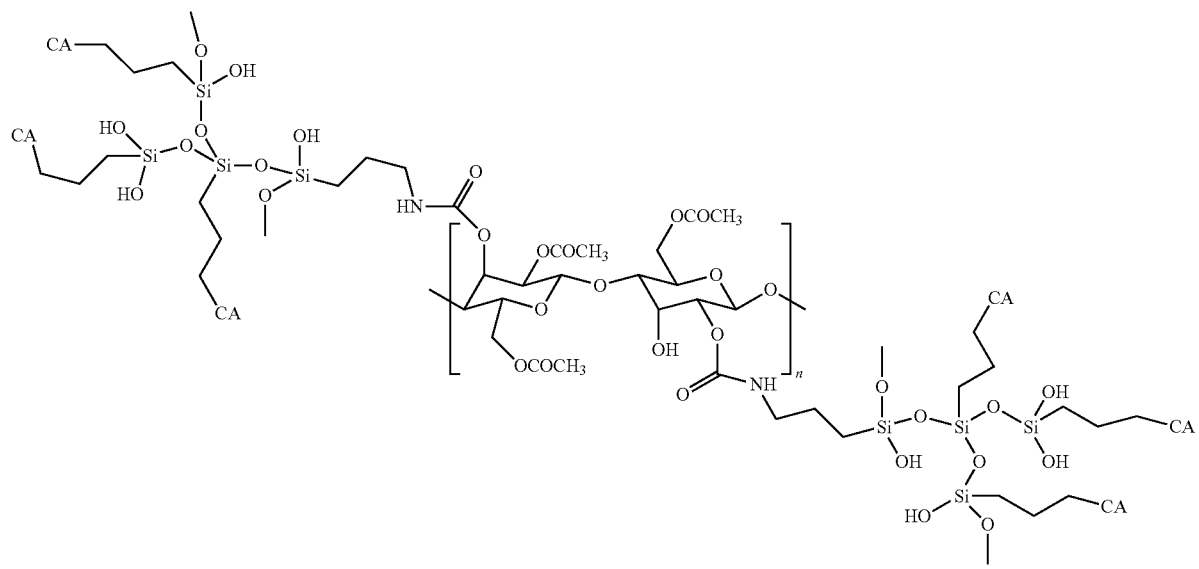

[Comparative Example 7] Production of Composite Membrane

A polymer having the following structure was synthesized using a technique similar to the method described in Polymer Bulletin, 2005, 53, 139-146, and a hyperbranched polyimide crosslinked organic-inorganic hybrid membrane c12 was produced using this polymer. The gas separating layer of c12 was made into the minimum thickness that was free of membrane defects.

[Comparative Example 8] Production of Simple Membrane

In a 50-mL brown vial, 0.6 g of polymer (P-103) and 8.6 g of tetrahydrofuran were mixed and stirred for 30 minutes, and then 38 mL of a tetrahydrofuran solution of 0.0450 g of aluminum acetylacetonate was added thereto. The mixture was stirred for another 30 minutes. The polymer liquid was transferred onto a glass Petri dish having a diameter of about 9 cm, and the polymer liquid was dried by blowing air for 8 hours at 100° C. and then was vacuum dried for 24 hours

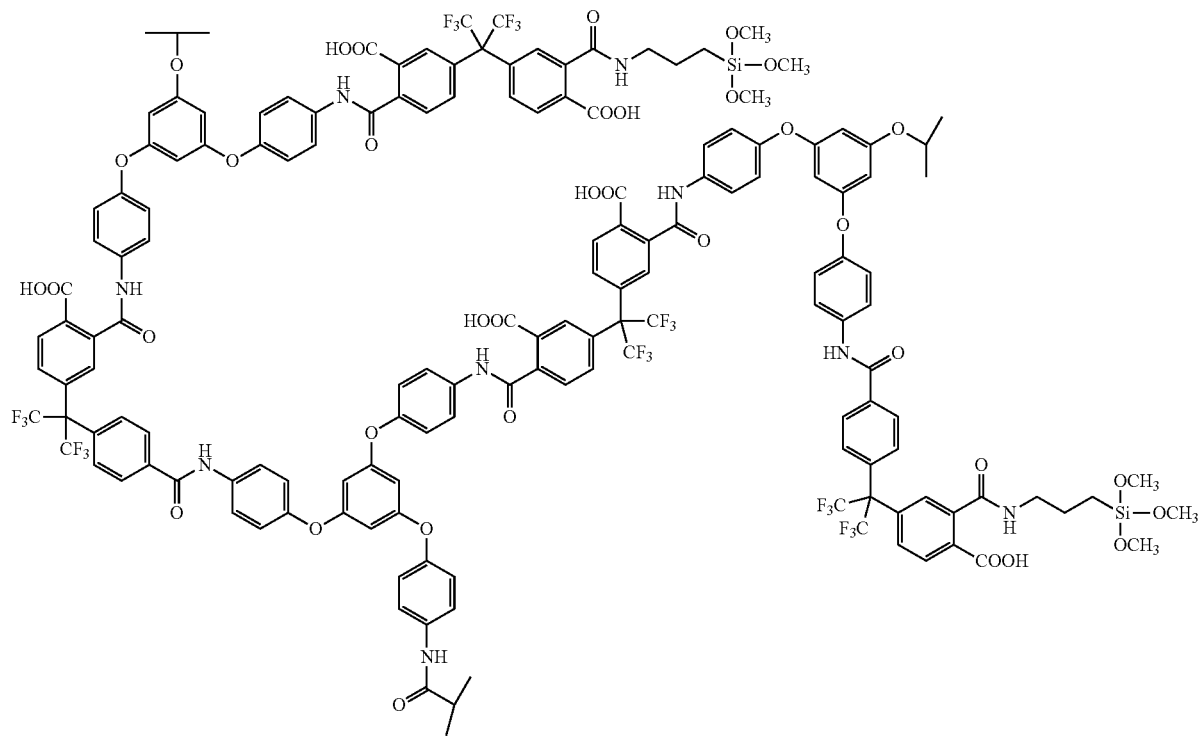 [SMILES: CO[Si](CCCNC(=O)c1cc(C(c2ccc(C(=O)Nc3ccc(Oc4cc(Oc5ccc(NC(=O)c6cc(C(c7ccc(C(=O)Nc8ccc(Oc9cc(Oc%10ccc(NC(=O)c%11ccc(C(c%12ccc(C(=O)O)c(C(=O)Nc%13ccc(Oc%14cc(Oc%15ccc(NC(=O)c%16ccc(C(c%17ccc(C(=O)O)c(C(=O)NCCC[Si](OC)(OC)OC)c%17)(C(F)(F)F)C(F)(F)F)cc%16C(=O)O)cc%15)cc(OC(C)C)c%14)cc%13)c%12)(C(F)(F)F)C(F)(F)F)cc%11)cc%10)cc(Oc%10ccc(NC(=O)C(C)C)cc%10)c9)cc8)c(C(=O)O)c7)(C(F)(F)F)C(F)(F)F)ccc6C(=O)O)cc5)cc(OC(C)C)c4)cc3)cc2)(C(F)(F)F)C(F)(F)F)ccc1C(=O)O)(OC)OC]

at 130° C. The membrane thickness of the simple membrane c13 thus obtained was about 50 μm.

[Comparative Examples 9 to 11] Production of Simple Membrane

Simple membranes c14 to c16 were produced according to the technique of Comparative Example 8.

[Test Example 1] Evaluation of Membrane Thickness

If the separating layer of the gas separation membrane can be formed into a thin layer, high gas permeation performance can be obtained. In order to investigate the precision of thickness reduction of the separating layer, ten sites of membrane thickness measurement that were separated apart by 1 cm or more were randomly selected in the separating layer that constitutes the gas separation membrane, membrane thickness measurement was carried out at these sites, and thus the membrane thickness distribution was evaluated.
(Evaluation Criteria)
A: The membrane thicknesses at the ten sites were all more than 0 μm and less than or equal to 1 μm.
B: The criterion A was not applicable, but the membrane thicknesses at the ten sites were all more than 0 μm and less than or equal to 2 μm.
C: The criteria A and B were not applicable.

[Test Example 2] Evaluation of Membrane Thickness Uniformity

The coefficient of variation of the membrane thickness at the ten sites of the gas separating layer measured as described above was calculated, and the coefficient of variation was evaluated according to the following criteria.
(Evaluation Criteria)
A: The coefficient of variation was less than 0.3.
B: The coefficient of variation was 0.3 or more but less than 0.5.
C: The coefficient of variation was 0.5 or more but less than 1.0.
D: The coefficient of variation was 1.0 or more but less than 2.0.

[Test Example 3] Sample Error Rate

Fifty samples each of the gas separation membranes described above in Examples and Comparative Examples were produced, and the permeability of hydrogen was measured for the samples. A sample having a hydrogen gas permeance value of more than 1,000,000 GPU ($1\times10^6$ $cm^3/cm^2 \cdot sec \cdot cmHg$) was considered as a membrane having pinholes (sample error), and the sample error rate was determined by the following formula:

[Sample error rate=(the number of membranes having pinholes/50)×100].

(Evaluation Criteria)
A: The error rate was 5% or less.
B: The error rate was more than 5% but less than 10%.
C: The error rate was 10% or more.

[Test Example 4] Performance Evaluation

<Evaluation of Gas Permeability>
In regard to the composite membranes thus obtained, the permeation performance of the respective gases of $CO_2$ and $CH_4$ was measured by TCD detection type gas chromatography at 40° C. and a total pressure on the gas supply side of 40 atmospheric pressure (partial pressure of $CO_2$ and $CH_4$: 20 atmospheric pressure), using a stainless steel cell made of SUS316 having resistance to high pressure (manufactured by Denissen Co.) and using a mass flow controller such that the volume ratio of $CO_2$ and $CH_4$ would be 1:1. A comparison of the gas permeability of the membranes was conducted by calculating the gas permeance. The unit of the gas permeance (gas permeation rate) is expressed in GPU unit [1 GPU=$1\times10^{-6}$ $cm^3$ (STP)/($cm^2 \cdot sec \cdot cmHg$)].
<Evaluation of Gas Separation Performance>
—Heat and Humidity Aging Test—
The gas separation composite membranes produced in Examples and Comparative Examples were stored for 24 hours under the conditions of 80° C. and a humidity of 90% (low temperature thermo-hygrostat manufactured by Isuzu Seisakusho Co., Ltd., crystal), and then the gas permeability was investigated as described above (unit: GPU). The ratio of the GPU values thus obtained (ratio of gas permeation rates of $CO_2$ and $CH_4$ ($R_{CO2}/R_{CH4}$)) was evaluated.
<Toluene Exposure Test>
Toluene solvent was introduced into a 100-mL beaker, and the beaker was placed in a glass container that could be sealed with a stretchable lid. The gas separation composite membranes produced in the Examples and Comparative Examples were also placed in the beaker, and the beakers were covered with glass lids to provide a tightly sealed system. Thereafter, the membranes were stored for 24 hours under the conditions of 40° C., and then the gas separation performance was evaluated as described above.

[Test Example 5] Bending Test

The gas separation membrane according to the present invention is desirably used as a package referred to as a module or an element in which the membrane is packed. When the gas separation membrane is used as the module, the membranes are packed with high density in order to increase a membrane surface area, and therefore packed by bending the membranes in a spiral shape in a flat sheet membrane. Thus, sufficient bending strength should be provided with the membrane. In order to confirm the performance, operations of bending each composite membrane at 180 degrees and unbending the membrane were repeated by 50 times, and then whether or not measurement of the gas permeability was allowed was confirmed.
(Evaluation Criteria)
A: The permeance to methane gas almost did not change before and after bending.
B: The permeance to methane gas obviously increased after bending.
The results of the various test examples described above are presented in Table 2.

TABLE 2

| | Membrane form | Membrane | Polymer | Copolymerization ratio x | Copolymerization ratio y | Weight average molecular weight | Metal complex Kind | Metal complex Concentration upon application (relative to polymer mass) [wt %] |
|---|---|---|---|---|---|---|---|---|
| Example 1 | Composite membrane | 101 | P-101 | 20 | 80 | 132,000 | $Al(acac)_3$ | 3.000 |
| Example 2 | Composite membrane | 102 | P-101 | 20 | 80 | 132,000 | $Al(acac)_3$ | 8.000 |
| Example 3 | Composite membrane | 103 | P-101 | 20 | 80 | 132,000 | $Al(acac)_3$ | 15.000 |
| Example 4 | Composite membrane | 104 | P-101 | 20 | 80 | 132,000 | $Al(OiPr)_3$ | 5.000 |
| Example 5 | Composite membrane | 105 | P-101 | 20 | 80 | 132,000 | $FeCl_3$ | 8.000 |
| Example 6 | Composite membrane | 106 | P-101 | 20 | 80 | 132,000 | $Ga(acac)_3$ | 2.000 |
| Example 7 | Composite membrane | 107 | P-101 | 20 | 80 | 132,000 | $In(acac)_3$ | 4.000 |
| Example 8 | Composite membrane | 201 | P-201 | 60 | 40 | 142,000 | $Ti(OiPr)_4$ | 0.400 |
| Example 9 | Composite membrane | 202 | P-201 | 60 | 40 | 142,000 | $Ti(OiPr)_4$ | 40.000 |
| Example 10 | Composite membrane | 203 | P-202 | 40 | 60 | 113,000 | $Zr(acac)_4$ | 15.000 |
| Example 11 | Composite membrane | 301 | P-301 | 85 | 15 | 157,000 | $Cu(OAc)_2$ | 0.800 |
| Example 12 | Composite membrane | 302 | P-302 | 40 | 60 | 89,000 | $Co(acac)_3$ | 25.000 |
| Example 13 | Composite membrane | 401 | P-401 | 20 | 80 | 127,000 | $Al(acac)_3$ | 3.000 |
| Example 14 | Composite membrane | 402 | P-401 | 20 | 80 | 127,000 | $Al(OiPr)_3$ | 8.000 |
| Example 15 | Composite membrane | 403 | P-401 | 20 | 80 | 127,000 | $Ni(acac)_2$ | 40.000 |
| Example 16 | Composite membrane | 501 | P-501 | 20 | 80 | 155,000 | $FeCl_3$ | 15.000 |
| Example 17 | Composite membrane | 502 | P-501 | 20 | 80 | 155,000 | $Ga(acac)_3$ | 5.000 |
| Example 18 | Composite membrane | 601 | P-601 | 10 | 90 | 133,000 | $Mn(acac)_2$ | 15.000 |
| Example 19 | Composite membrane | 602 | P-601 | 10 | 90 | 133,000 | $Ni(acac)_2$ | 2.000 |
| Example 20 | Composite membrane | 701 | P-701 | 20 | 80 | 118,000 | $Zr(acac)_4$ | 4.000 |
| Example 21 | Composite membrane | 702 | P-701 | 20 | 80 | 118,000 | $Ca(acac)_2$ | 0.400 |
| Example 22 | Composite membrane | 801 | P-801 | 40 | 60 | 154,000 | $Co(acac)_2$ | 25.000 |
| Example 23 | Composite membrane | 802 | P-801 | 40 | 60 | 154,000 | $Zn(acac)_2$ | 0.800 |
| Example 24 | Composite membrane | 803 | P-801 | 40 | 60 | 154,000 | $Mg(acac)_2$ | 40.000 |

| | Membrane thickness uniformity | Membrane thickness | Sample error rate | Bending test | $CO_2$ permeance [GPU] | $R_{CO2}/R_{CH4}$ Untreated | $R_{CO2}/R_{CH4}$ After heat and humidity aging test | $R_{CO2}/R_{CH4}$ After toluene exposure test |
|---|---|---|---|---|---|---|---|---|
| Example 1 | A | A | A | A | 85 | 45 | 44 | 42 |
| Example 2 | A | A | A | A | 84 | 35 | 33 | 32 |
| Example 3 | A | B | A | B | 84 | 32 | 30 | 28 |
| Example 4 | A | A | A | A | 86 | 43 | 40 | 39 |
| Example 5 | A | A | A | A | 84 | 45 | 43 | 40 |
| Example 6 | A | A | A | A | 90 | 44 | 43 | 42 |
| Example 7 | A | A | A | A | 91 | 44 | 44 | 42 |
| Example 8 | B | B | B | B | 62 | 37 | 31 | 28 |
| Example 9 | B | B | B | B | 84 | 30 | 25 | 21 |
| Example 10 | A | B | A | B | 85 | 32 | 32 | 31 |
| Example 11 | A | B | A | A | 74 | 40 | 38 | 37 |
| Example 12 | A | B | A | B | 86 | 31 | 27 | 25 |
| Example 13 | A | A | A | A | 84 | 44 | 43 | 42 |
| Example 14 | A | A | A | A | 86 | 35 | 34 | 34 |
| Example 15 | B | B | B | B | 87 | 29 | 26 | 22 |
| Example 16 | A | B | A | B | 86 | 31 | 28 | 25 |
| Example 17 | A | A | A | A | 85 | 44 | 42 | 42 |
| Example 18 | A | B | A | A | 88 | 35 | 30 | 28 |
| Example 19 | A | A | A | A | 83 | 44 | 43 | 43 |
| Example 20 | A | A | A | A | 84 | 45 | 45 | 43 |
| Example 21 | B | B | B | B | 65 | 39 | 26 | 22 |
| Example 22 | A | B | A | B | 88 | 34 | 28 | 25 |
| Example 23 | A | B | A | A | 70 | 36 | 32 | 29 |
| Example 24 | B | B | B | B | 89 | 28 | 25 | 21 |

| | Membrane form | Membrane | Polymer | Copolymerization ratio x | Copolymerization ratio y | Weight average molecular weight | Metal complex Kind | Metal complex Concentration upon application (relative to polymer mass) [wt %] |
|---|---|---|---|---|---|---|---|---|
| Comparative Example 1 | Composite membrane | c101 | P-101 | 20 | 80 | 132,000 | — | — |
| Comparative Example 2 | Composite membrane | c101 | P-102 | 100 | 0 | 135,000 | $Al(acac)_3$ | 5.000 |
| Comparative Example 3 | Composite membrane | c301 | P-301 | 85 | 15 | 157,000 | — | — |
| Comparative Example 4 | Composite membrane | c301 | P-301 | 100 | 0 | 133,000 | $Ga(acac)_3$ | 3.000 |
| Comparative Example 5 | Composite membrane | c601 | P-601 | 10 | 90 | 133,000 | — | — |
| Comparative Example 6 | Composite membrane | c11 | — | — | — | — | — | — |
| Comparative Example 7 | Composite membrane | c12 | — | — | — | — | — | — |
| Comparative Example 8 | Simple membrane | c13 | P-103 | 67 | 33 | 135,000 | $Al(acac)_3$ | 7.500 |
| Comparative Example 9 | Simple membrane | c14 | P-104 | 33 | 67 | 128,000 | $Al(acac)_3$ | 15.300 |

TABLE 2-continued

| | | | | | | | | |
|---|---|---|---|---|---|---|---|---|
| Comparative Example 10 | Simple membrane | | c15 | P-103 | 67 | 33 | 135,000 | — | — |
| Comparative Example 11 | Simple membrane | | c16 | P-104 | 33 | 67 | 128,000 | — | — |

| | Membrane thickness uniformity | Membrane thickness | Sample error rate | Bending test | $CO_2$ permeance [GPU] | $R_{CO2}/R_{CH4}$ (Ratio of gas permeation rates) | | |
|---|---|---|---|---|---|---|---|---|
| | | | | | | Untreated | After heat and humidity aging test | After toluene exposure test |
| Comparative Example 1 | C | B | C | B | 55 | 20 | 15 | 11 |
| Comparative Example 2 | C | B | C | B | 53 | 21 | 14 | 12 |
| Comparative Example 3 | C | B | C | B | 52 | 18 | 15 | 10 |
| Comparative Example 4 | C | B | C | B | 50 | 19 | 16 | 12 |
| Comparative Example 5 | C | B | C | B | 51 | 18 | 16 | 12 |
| Comparative Example 6 | D | C | C | B | Membrane was broke. | — | — | — |
| Comparative Example 7 | D | C | C | B | 11 | 26 | 17 | 9 |
| Comparative Example 8 | A | C | C | B | 0.72 | 16 | 11 | 8 |
| Comparative Example 9 | A | C | C | B | 0.45 | 20 | 15 | 11 |
| Comparative Example 10 | A | C | C | B | 0.74 | 15 | 11 | 9 |
| Comparative Example 11 | A | C | C | B | 0.44 | 21 | 16 | 11 |

Comparative Examples 1, 3 and 5 are examples in which no metal complex was added. In these cases, since the polyimide compound was not crosslinked, the coating liquid easily penetrated into the porous support, while the membrane had many membrane defects and a high sample error rate. Furthermore, Comparative Examples 2 and 4 are examples in which the polyimide compound had no active hydrogen. In these cases, even if a metal complex was added, a crosslinked structure was not formed, while the sample error rate was similarly high.

In Comparative Examples 6 and 7, since the coating liquid was applied on the support after a metal-crosslinked polyimide was formed, thickness reduction of the gas separating layer was difficult. Furthermore, the gas separation membranes of Comparative Examples 1 to 7 all exhibited poor results on the $CO_2$ permeation performance and the ratio of gas permeation rates of $CO_2$ and $CH_4$ ($R_{CO2}/R_{CH4}$).

Comparative Examples 8 to 11 are all simple membranes, and Comparative Examples 8 and 9 are examples in which a metal complex was added, while Comparative Examples 10 and 11 are examples in which no metal complex was added. When comparisons are made between Comparative Examples 8 and 10, and between Comparative Examples 9 and 11, the difference in performance was almost not recognized. This result is consistent with the descriptions of Non-Patent Literature 4, and it is understood from this result that an enhancement of performance by the formation of crosslinking using a metal complex is manifested only in a composite membrane.

On the other hand, in the gas separation composite membranes of the present invention (Examples 1 to 24) in which the gas separating layer was formed using a metal-crosslinked polyimide resin, the gas separating layer could be made into a more uniform and thinner c. Furthermore, the gas separation composite membranes of the present invention did not easily cause membrane defects produced therein (see the sample error rate) even if the membrane was made thinner. In addition, these membranes exhibited excellent durability against bending. The membranes also had excellent $CO_2$ permeance, and had increased ratios of the rates of gas permeation ($R_{CO2}/R_{CH4}$). Furthermore, the gas separation composite membranes of the present invention were hardly affected by a heat and humidity aging treatment and a toluene treatment, and even if the membranes were subjected to these treatments, the membranes exhibited satisfactory ratios of gas permeation rates.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Gas separating layer
2 Porous layer
3 Nonwoven fabric layer
10 and 20 Gas separation composite membrane

The invention claimed is:

1. A gas separation composite membrane, comprising:
a gas permeable supporting layer; and
a gas separating layer containing a crosslinked polyimide resin above the gas permeable supporting layer,
wherein the crosslinked polyimide resin has a structure in which 2 to 4 molecules of a polyimide compound is coordinated with a divalent to tetravalent central metal via an oxygen atom or a sulfur atom,
wherein when the crosslinked polyimide resin has plural central metals, the plural central metals are linked via the polyimide chain of the polyimide compound, and
wherein a concentration of metal complex in a coating liquid forming the gas separating layer is from 0.2% to 30% by mass relative to 100% by mass of the polyimide compound.

2. The gas separation composite membrane according to claim 1, wherein the polyimide compound has a repeating unit represented by Formula (I), a repeating unit represented by Formula (II-a) or (II-b), and a repeating unit represented by Formula (III-a) or (III-b):

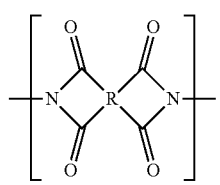

Formula (I)

wherein R represents a group having a structure represented by any one of Formulas (I-a) to (I-h); $X^1$ represents a single bond or a divalent linking group; L represents —CH=CH— or —CH$_2$—; R$^1$ and R$^2$ each represent a hydrogen atom or a substituent; and the symbol "*" represents a bonding site to the carbonyl group;

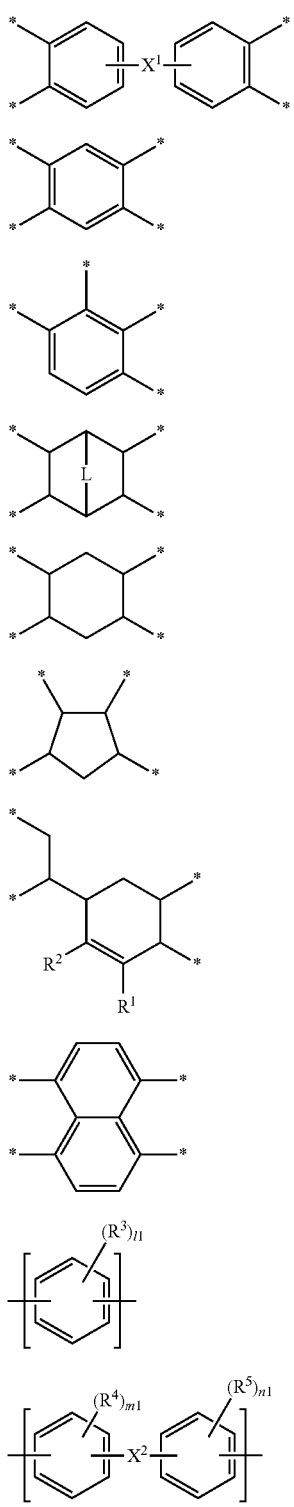

(I-a)
(I-b)
(I-c)
(I-d)
(I-e)
(I-f)
(I-g)
(I-h)

Formula (II-a)
Formula (II-b)

wherein R$^3$ represents an alkyl group or a halogen atom; R$^4$ and R$^5$ each represent an alkyl group or a halogen atom, or are linked to each other to form a ring together with X$^2$; l1, m1 and n1 each represent an integer of from 0 to 4; and X$^2$ represents a single bond or a divalent linking group; and

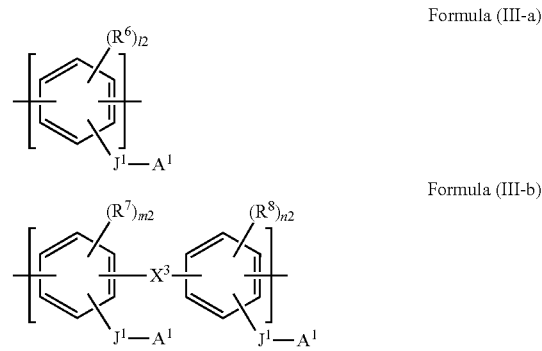

Formula (III-a)
Formula (III-b)

wherein R$^6$, R$^7$, and R$^8$ each represent a substituent; J$^1$ represents a single bond or a divalent linking group; l2, m2, and n2 each represent an integer of from 0 to 3; A$^1$ represents a group selected from the group consisting of —COOH, —OH, —SH, and —S(=O)$_2$OH; and X$^3$ represents a single bond or a divalent linking group.

3. The gas separation composite membrane according to claim 1, wherein the central metal is Be, Mg, Ca, Sc, Y, Ti, Zr, V, Cr, Mo, Mn, Fe, Co, Ni, Cu, Zn, B, Al, Ga, or In.

4. The gas separation composite membrane according to claim 1, wherein in a case in which the gas to be separation treated is a mixed gas of carbon dioxide and methane, the permeation rate of the carbon dioxide at 40° C. and 40 atmospheric pressure is more than 20 GPU, and the ratio of the permeation rate of the carbon dioxide to the permeation rate of the methane ($R_{CO2}/R_{CH4}$) is 15 or more.

5. The gas separation composite membrane according to claim 1, wherein the supporting layer comprises a porous layer on a side of the gas separating layer and a nonwoven fabric layer on a side reverse thereto.

6. The gas separation composite membrane according to claim 5, wherein the cut-off molecular weight of the porous layer is 100,000 or less.

7. A gas separation module, comprising the gas separation composite membrane according to claim 1.

8. A gas separation apparatus, comprising the gas separation module according to claim 7.

9. A method of separating a gas, comprising causing carbon dioxide to selectively permeate from a gas containing carbon dioxide and methane, using the gas separation composite membrane according to claim 1.

10. A method of producing a gas separation composite membrane,
wherein the gas separation composite membrane comprises a gas permeable supporting layer, and a gas separating layer above the gas permeable supporting layer,
the method comprising the steps of:
applying a solution comprising a polyimide compound having an active hydrogen-containing group and a metal complex above the gas permeable supporting layer, thereby performing ligand exchange between the polyimide compound and the metal complex; and
forming the gas separating layer comprising a metal-crosslinked polyimide resin above the gas permeable supporting layer, wherein a concentration of the metal complex in a coating liquid forming the gas separating layer is from 0.2% to 30% by mass relative to 100% by mass of the polyimide compound.

11. The method according to claim 10, wherein the central atom of the metal complex is Be, Mg, Ca, Sc, Y, Ti, Zr, V, Cr, Mo, Mn, Fe, Co, Ni, Cu, Zn, B, Al, Ga, or In.

12. The method according to claim 10, wherein the metal complex has two or more ligands selected from the group consisting of an alkoxy group, an aryloxy group, a carboxylate group, a sulfate group, a cyano group, an ammonium group, a phosphate group, a β-diketone, a β-keto ester, and a halogen atom.

13. The method according to claim 10, wherein the polyimide compound has a repeating unit represented by Formula (I), a repeating unit represented by Formula (II-a) or (II-b), and a repeating unit represented by Formula (III-a) or (III-b):

Formula (I)

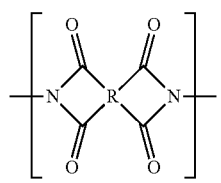

wherein R represents a group having a structure represented by any one of Formulas (I-a) to (I-h); $X^1$ represents a single bond or a divalent linking group; L represents —CH=CH— or —CH$_2$—; $R^1$ and $R^2$ each represent a hydrogen atom or a substituent; and the symbol "*" represents a bonding site to the carbonyl group;

(I-a)

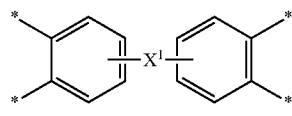

(I-b)

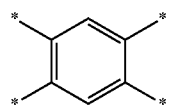

(I-c)

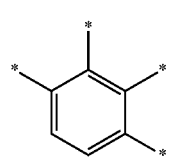

(I-d)

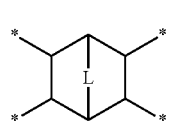

(I-e)

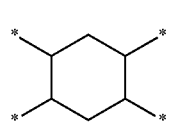

(I-f)

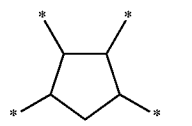

(I-g)

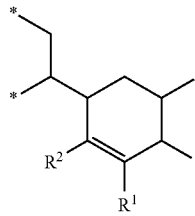

(I-h)

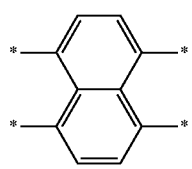

Formula (II-a)

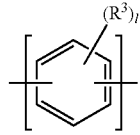

Formula (II-b)

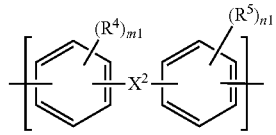

wherein $R^3$ represents an alkyl group or a halogen atom; $R^4$ and $R^5$ each represent an alkyl group or a halogen atom, or are linked to each other to form a ring together with $X^2$; l1, m1 and n1 each represent an integer of from 0 to 4; and $X^2$ represents a single bond or a divalent linking group; and Formula (III-a)

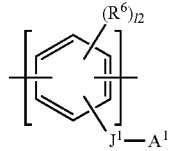

Formula (III-b)

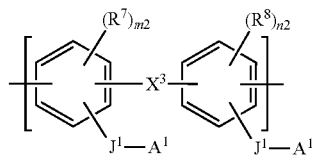

wherein $R^6$, $R^7$, and $R^8$ each represent a substituent; $J^1$ represents a single bond or a divalent linking group; l2, m2, and n2 each represent an integer of from 0 to 3; $A^1$ represents a group selected from the group consisting of —COOH, —OH, —SH, and —S(=O)$_2$OH; and $X^3$ represents a single bond or a divalent linking group.

14. The method according to claim 10, wherein the crosslinked polyimide resin has a structure in which 2 to 4 molecules of a polyimide compound is coordinated with a divalent to tetravalent central metal via an oxygen atom or a sulfur atom, and when the crosslinked polyimide resin has plural central metals, the plural central metals are linked via the polyimide chain of the polyimide compound.

* * * * *